United States Patent
Liu et al.

(10) Patent No.: US 12,120,641 B2
(45) Date of Patent: Oct. 15, 2024

(54) METHOD AND DEVICE FOR USE IN COMMUNICATION NODE FOR RANDOM ACCESS WIRELESS COMMUNICATIONS

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 497 days.

(21) Appl. No.: 17/372,503

(22) Filed: Jul. 11, 2021

(65) Prior Publication Data

US 2021/0337518 A1  Oct. 28, 2021

Related U.S. Application Data

(63) Continuation of application No. PCT/CN2020/088866, filed on May 7, 2020.

(30) Foreign Application Priority Data

May 23, 2019 (CN) .......................... 201910432002.0

(51) Int. Cl.
*H04W 72/02* (2009.01)
*H04W 8/24* (2009.01)
(Continued)

(52) U.S. Cl.
CPC ............. *H04W 72/02* (2013.01); *H04W 8/24* (2013.01); *H04W 72/0446* (2013.01); *H04W 72/0453* (2013.01); *H04W 72/51* (2023.01)

(58) Field of Classification Search
CPC ... H04L 5/0044; H04L 5/0053; H04L 5/0094; H04W 72/02; H04W 8/24;
(Continued)

(56) References Cited

U.S. PATENT DOCUMENTS

2009/0196229 A1* 8/2009 Shen ........................ H04B 1/69
370/328
2010/0034092 A1* 2/2010 Krishnamurthy ..... H04W 56/00
370/241
(Continued)

FOREIGN PATENT DOCUMENTS

CN 107786473 A 3/2018
CN 108282298 A 7/2018
(Continued)

OTHER PUBLICATIONS

English translation of International Search Report for PCT/CN2020/088866; Liu et al.; mailed Aug. 5, 2020; retrieved from the Internet Oct. 10, 2023 (Year: 2020).*
(Continued)

*Primary Examiner* — Benjamin H Elliott, IV

(57) ABSTRACT

The disclosure provides a method and a device for use in a communication node for wireless communications. The communication node receives first information and second information, and transmits a first signal; wherein the first information and the second information are used for determining a first time-frequency resource pool and a second time-frequency resource pool respectively, the first signal occupies a target time-frequency resource block; a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block belongs to the first (Continued)

time-frequency resource pool or the second time-frequency resource pool. The disclosure improves random access performances.

17 Claims, 8 Drawing Sheets

(51) Int. Cl.
*H04W 72/0446* (2023.01)
*H04W 72/0453* (2023.01)
*H04W 72/51* (2023.01)

(58) Field of Classification Search
CPC ......... H04W 72/0446; H04W 72/0453; H04W 72/51; H04W 72/23; H04W 74/0833; H04W 84/06; H04W 72/53
See application file for complete search history.

(56) References Cited

U.S. PATENT DOCUMENTS

| | | | |
|---|---|---|---|
| 2014/0321397 A1* | 10/2014 | Shen | H04L 5/0037 370/329 |
| 2017/0019909 A1* | 1/2017 | Si | H04L 47/27 |
| 2018/0098323 A1* | 4/2018 | Zhang | H04L 5/00 |
| 2019/0199552 A1* | 6/2019 | Liu | H04L 25/0226 |
| 2020/0305127 A1* | 9/2020 | Huang | H04W 72/0453 |
| 2020/0396754 A1* | 12/2020 | Wu | H04W 72/12 |
| 2021/0045126 A1* | 2/2021 | Lee | H04W 72/535 |
| 2021/0136744 A1* | 5/2021 | Lu | H04W 72/02 |
| 2021/0136827 A1* | 5/2021 | Xiong | H04W 74/004 |
| 2021/0160834 A1* | 5/2021 | Peng | H04L 5/0005 |
| 2021/0168814 A1* | 6/2021 | Chen | H04W 72/02 |
| 2021/0258921 A1* | 8/2021 | Zhang | H04W 72/40 |
| 2021/0329633 A1* | 10/2021 | Xing | H04L 5/0048 |
| 2021/0329732 A1* | 10/2021 | Zhang | H04W 72/12 |
| 2021/0337518 A1* | 10/2021 | Liu | H04W 72/0446 |

FOREIGN PATENT DOCUMENTS

| | | | | |
|---|---|---|---|---|
| CN | 201810912172.4 | * | 8/2018 | ........ H04W 72/0493 |
| CN | 108631987 A | | 10/2018 | |
| CN | 109391346 A | | 2/2019 | |
| WO | WO-2015196478 A1 | * | 12/2015 | ............ H04W 24/08 |

OTHER PUBLICATIONS

"Bandwidth parts and Resource Pools for NR V2X"; Ericsson; 3GPP TSG-RAN WG2 #105 TDoc R2-1901649 Athens, Greece, Feb. 25-Mar. 1, 2019 (Year: 2019).*
"Considerations for Sidelink Resource Pool Design for NR V2X"; Samsung; 3GPP TSG-RAN WG2 Meeting #106 R2-1907712 Reno, USA, May 13-17, 2019 (Year: 2019).*
ISR in application PCT/CN2020/088866 dated Jul. 27, 2020.
ETRI "Considerations on NR impacts for Non-Terrestrial Networks"3GPPTSGRANWG1Meeting#92bis R1-1804495,Apr. 20, 2018 (Apr. 20, 2018).
First Office Action received in application No. CN201910432002.0 dated Jun. 2, 2021.
First Search Report received in application No. CN201910432002.0 dated May 27, 2021.

* cited by examiner

METHOD AND DEVICE FOR USE IN COMMUNICATION NODE FOR RANDOM ACCESS WIRELESS COMMUNICATIONS

CROSS REFERENCE TO RELATED APPLICATIONS

This application is a continuation of International Application No. PCT/CN2020/088866, filed May 7, 2020, claims the priority benefit of Chinese Patent Application No. 201910432002.0, filed on May 23, 2019, the full disclosure of which is incorporated herein by reference.

BACKGROUD

Technical Field

The disclosure relates to transmission methods and devices in wireless communication systems, and in particular to a transmission method and device for large delay.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or 5G). The work item of NR was approved at the 3GPP RAN #75 session to standardize the NR.

In order to be able to adapt to various application scenarios and meet different requirements, the 3GPP Radio Access Network (RAN) #75 plenary session also approved a study item of Non-Terrestrial Network (NTN) under NR. The study item is started in R15. The 3GPP Radio Access Network (RAN) #79 plenary session decided to start studying the solutions in NTN, and to initiate WI in R16 or R17 to standardize related technologies.

SUMMARY

In NTN networks, UEs perform communication with satellites or aircrafts through 5G networks; since the satellites or aircrafts have much longer distances to the UEs than terrestrial base stations to the UEs, long propagation delays are caused when the satellites or aircrafts perform communication with the UEs. In addition, when a satellite is used as repeater for a terrestrial base station, the delay of a feeder link between the satellite and the terrestrial base station will further increase the propagation delay between the UE and the base station. On the other hand, since the satellite and aircraft have much larger coverages than a terrestrial network, meanwhile the terrestrial devices have different angles of tilt to the satellite or aircraft, there is a very big difference between the delays in NTN. In existing Long Term Evolution (LTE) or 5G NR systems, a maximum delay is merely a few microseconds or dozens of microseconds; however, in NTN, a maximum delay may be up to a few milliseconds, even dozens of milliseconds. Since random accesses in existing LTE or NR are all designed for conventional terrestrial communications, they cannot be directly applied to the NTN networks. Therefore, a new design is needed to support large-delay networks, particularly the NTN communication.

In view of the problems in random access design in large-delay networks, particularly in the NTN communication, the disclosure provides a solution. It should be noted that the embodiments of the base station in the disclosure and the characteristics of the embodiments may be applied to the UE if no conflict is incurred. The embodiments of the disclosure and the characteristics of the embodiments may be arbitrarily combined mutually if no conflict is incurred.

The disclosure provides a method in a first communication node for wireless communications, wherein the method includes:
  receiving first information and receiving second information, the first information and the second information being used for determining a first time-frequency resource pool and a second time-frequency resource pool respectively; and
  transmitting a first signal, the first signal occupying a target time-frequency resource block.

Herein, the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, the first communication node in the disclosure determines a format of a preamble to be transmitted or resources occupied by a random access channel according to its own positioning capability or possible positioning information that can be acquired, thereby optimizing the design of random access according to different capabilities and different scenarios, and thus improving the overall performance of the system.

In one embodiment, preamble formats and random access channel formats occupying different numbers of time domain resources are designed according to different positioning capabilities, which guarantees the random access performances under the condition of different UE capabilities.

According to one aspect of the disclosure, an absolute value of a time difference between a start time of transmitting the first signal and a reference time is equal to a first timing adjustment quantity, and a receive timing of the first communication node is used for determining the reference time; when the target time-frequency resource block belongs to the first time-frequency resource pool, the first timing adjustment quantity is greater than 0; and when the target time-frequency resource block belongs to the second time-frequency resource pool, the first timing adjustment quantity is equal to 0.

In one embodiment, the first timing adjustment quantity is correlated to the time-frequency resource pool to which the target time-frequency resource block belongs, which guarantees the optimized design of preamble sequence in the condition that the UE can accurately acquire positioning information and then transmit uplink timing information, reduces the overhead of preamble resources for random access and improves the success probability of random access.

According to one aspect of the disclosure, the method further includes:

determining a target sequence.

Herein, when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1.

In one embodiment, random access channels of different time-domain lengths are designed according to the time-frequency resource pool to which the target time-frequency resource block belongs, and the random access channels of different lengths are realized by one same target sequence through different time-domain repetitions, thus, the design of system is simplified, the complexity of implementation is reduced, and good compatibility is guaranteed.

According to one aspect of the disclosure, the method further includes:

receiving third information.

Herein, the third information is used for determining X candidate sequences, and X is a positive integer greater than 1; the target sequence is one of the X candidate sequences, and the first communication node selects the target sequence among the X candidate sequences randomly.

According to one aspect of the disclosure, the method further includes:

receiving a first signaling in a first time window.

Herein, a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window out of the Y candidate time windows.

According to one aspect of the disclosure, the method further includes:

transmitting a second signal.

Herein, the second signal carries fourth information, and the fourth information is used for indicating a positioning capability of the first communication node.

In one embodiment, the positioning capability of the first communication node is reported to the network through a MsgA or Msg3, so that the network can configure the consequent transmission of the UE according to the positioning capability of the UE, and the network can realize the specific optimization of the system as early as possible.

According to one aspect of the disclosure, when the first communication node can acquire the positioning information of the first communication node, the first communication node determines by itself a time-frequency resource pool to which the target time-frequency resource block belongs between the first time-frequency resource pool and the second time-frequency resource pool; when the first communication node cannot acquire the positioning information of the first communication node, the target time-frequency resource block belongs to the first time-frequency resource pool.

The disclosure provides a method in a second communication node for wireless communications, wherein the method includes:

transmitting first information and transmitting second information, the first information and the second information being used for determining a first time-frequency resource pool and a second time-frequency resource pool respectively; and receiving a first signal, the first signal occupying a target time-frequency resource block.

Herein, the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

According to one aspect of the disclosure, an absolute value of a time difference between a start time of transmitting the first signal and a reference time is equal to a first timing adjustment quantity, and a receive timing of the first communication node is used for determining the reference time; when the target time-frequency resource block belongs to the first time-frequency resource pool, the first timing adjustment quantity is greater than 0; and when the target time-frequency resource block belongs to the second time-frequency resource pool, the first timing adjustment quantity is equal to 0.

According to one aspect of the disclosure, the method includes:

determining a target sequence.

Herein, the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1.

According to one aspect of the disclosure, the method includes:

transmitting third information.

Herein, the third information is used for determining X candidate sequences, and X is a positive integer greater than 1; the target sequence is one of the X candidate sequences, and the first communication node selects the target sequence among the X candidate sequences randomly.

According to one aspect of the disclosure, the method includes:

transmitting a first signaling in a first time window.

Herein, a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window out of the Y candidate time windows.

According to one aspect of the disclosure, the method includes:

receiving a second signal.

Herein, the second signal carries fourth information, and the fourth information is used for indicating a positioning capability of the first communication node.

According to one aspect of the disclosure, when the first communication node can acquire the positioning information of the first communication node, the first communication node determines by itself a time-frequency resource pool to which the target time-frequency resource block belongs between the first time-frequency resource pool and the second time-frequency resource pool; when the first communication node cannot acquire the positioning information of the first communication node, the target time-frequency resource block belongs to the first time-frequency resource pool.

The disclosure provides a first communication node for wireless communications, wherein the first communication node includes:

a first receiver, to receive first information and to receive second information, the first information and the second information being used for determining a first time-frequency resource pool and a second time-frequency resource pool respectively; and a first transmitter, to transmit a first signal, the first signal occupying a target time-frequency resource block.

Herein, the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

The disclosure provides a second communication node for wireless communications, wherein the second communication node includes:

a second transmitter, to transmit first information and to transmit second information, the first information and the second information being used for determining a first time-frequency resource pool and a second time-frequency resource pool respectively; and a second receiver, to receive a first signal, the first signal occupying a target time-frequency resource block.

Herein, the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, compared with the method of random access in present terrestrial networks, the disclosure mainly has the following technical advantages.

With the method in the disclosure, the UE can determine a format of a preamble to be transmitted or resources occupied by a random access channel according to its own positioning capability or possible positioning information that can be acquired, thereby optimizing the design of random access according to different capabilities and different scenarios, and thus improving the overall performance of the system.

With the method in the disclosure, preamble formats and random access channel formats occupying different numbers of time domain resources are designed according to different positioning capabilities, which guarantees the random access performances under the condition of different UE capabilities.

The method in the disclosure guarantees the optimized design of preamble sequence in the condition that the UE can accurately acquire positioning information and then transmit uplink timing information, reduces the overhead of preamble resources for random access and improves the success probability of random access.

The method in the disclosure designs random access channels of different time-domain lengths, and the random access channels of different lengths are realized by one same target sequence through different time-domain repetitions, thus, the design of system is simplified, the complexity of implementation is reduced, and good compatibility is guaranteed.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.
Embodiment 1

Figure 1:
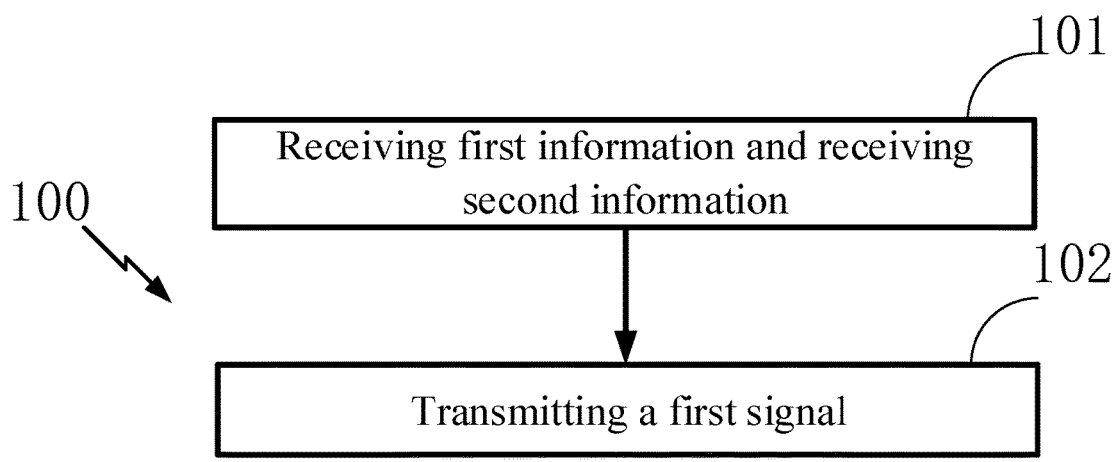
FIG. 1 is a flowchart of first information, second information and a first signal according to one embodiment of the disclosure.

Embodiment 1 illustrates a flowchart of transmission of first information, second information and a first signal according to one embodiment of the disclosure, as shown in FIG. 1. In FIG. 1, each box represents one step, and it should be noted that the order of each box shown in the figure does not represent the relationship in time precedence between the steps represented.

In Embodiment 1, the first communication node in the disclosure receives first information and receives second information in S101, and transmits a first signal in S102; the first information and the second information are used for determining a first time-frequency resource pool and a second time-frequency resource pool respectively; the first signal occupies a target time-frequency resource block; the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, the first information and the second information are independent of each other.

In one embodiment, the first information and the second information experience joint coding.

In one embodiment, the first information and the second information are two pieces of sub-information in one piece of information.

In one embodiment, the first information and the second information are carried through one same signaling.

In one embodiment, the first information and the second information are carried through two different signalings.

In one embodiment, the first information is the second information.

In one embodiment, the first information and the second information are two different fields in one same signaling.

In one embodiment, the first information and the second information are two different Information Elements (IEs) in one same signaling.

In one embodiment, the first information and the second information are carried through one Physical Downlink Shared Channel (PDSCH).

In one embodiment, the first information and the second information are carried through two different PDSCHs.

In one embodiment, the first information is transmitted through a higher layer signaling.

In one embodiment, the first information is transmitted through a physical layer signaling.

In one embodiment, the first information includes part or all of one higher layer signaling.

In one embodiment, the first information includes part or all of one physical layer signaling.

In one embodiment, the first information includes part or all IEs in one Radio Resource Control (RRC) signaling.

In one embodiment, the first information includes part or all fields in one IE in one RRC signaling.

In one embodiment, the first information includes part or all fields in one Medium Access Control (MAC) layer signaling.

In one embodiment, the first information includes part or all of one System Information Block (SIB).

In one embodiment, the first information includes part or all of one MAC Control Element (CE).

In one embodiment, the first information includes part or all of one MAC header.

In one embodiment, the first information is transmitted through one Downlink Shared Channel (DL-SCH).

In one embodiment, the first information is transmitted through one Physical Downlink Shared Channel (PDSCH).

In one embodiment, the first information is related to a coverage of the second communication node in the disclosure.

In one embodiment, the first information is related to a height of the second communication node in the disclosure.

In one embodiment, the first information is related to a type of the second communication node in the disclosure.

In one embodiment, the first information is related to an angle of tilt of the second communication node in the disclosure relative to the first communication node in the disclosure.

In one embodiment, the first information is related to a size of a coverage of the second communication node in the disclosure.

In one embodiment, the first information is broadcast.

In one embodiment, the first information is cell specific.

In one embodiment, the first information is UE specific.

In one embodiment, the first information is UE group specific.

In one embodiment, the first information is geographical area specific.

In one embodiment, the first information includes part or all fields in one Downlink Control Information (DCI) signaling.

In one embodiment, the second information is transmitted through a higher layer signaling.

In one embodiment, the second information is transmitted through a physical layer signaling.

In one embodiment, the second information includes part or all of one higher layer signaling.

In one embodiment, the second information includes part or all of one physical layer signaling.

In one embodiment, the second information includes part or all IEs in one Radio Resource Control (RRC) signaling.

In one embodiment, the second information includes part or all fields in one IE in one RRC signaling.

In one embodiment, the second information includes part or all fields in one Medium Access Control (MAC) layer signaling.

In one embodiment, the second information includes part or all of one System Information Block (SIB).

In one embodiment, the second information includes part or all of one MAC Control Element (CE).

In one embodiment, the second information includes part or all of one MAC header.

In one embodiment, the second information is transmitted through one Downlink Shared Channel (DL-SCH).

In one embodiment, the second information is transmitted through one Physical Downlink Shared Channel (PDSCH).

In one embodiment, the second information is related to a coverage of the second communication node in the disclosure.

In one embodiment, the second information is related to a height of the second communication node in the disclosure.

In one embodiment, the second information is related to a type of the second communication node in the disclosure.

In one embodiment, the second information is related to an angle of tilt of the second communication node in the disclosure relative to the first communication node in the disclosure.

In one embodiment, the second information is related to a size of a coverage of the second communication node in the disclosure.

In one embodiment, the second information is broadcast.

In one embodiment, the second information is cell specific.

In one embodiment, the second information is UE specific.

In one embodiment, the second information is UE group specific.

In one embodiment, the second information is geographical area specific.

In one embodiment, the second information includes part or all fields in one Downlink Control Information (DCI) signaling.

In one embodiment, the phrase that the first information and the second information are used for determining a first time-frequency resource pool and a second time-frequency resource pool respectively includes the following meaning: the first information and the second information are used by the first communication node in the disclosure to determine the first time-frequency resource pool and the second time-frequency resource pool respectively.

In one embodiment, the phrase that the first information and the second information are used for determining a first time-frequency resource pool and a second time-frequency resource pool respectively includes the following meaning: the first information and the second information are used for directly indicating the first time-frequency resource pool and the second time-frequency resource pool respectively.

In one embodiment, the phrase that the first information and the second information are used for determining a first time-frequency resource pool and a second time-frequency resource pool respectively includes the following meaning: the first information and the second information are used for indirectly indicating the first time-frequency resource pool and the second time-frequency resource pool respectively.

In one embodiment, the phrase that the first information and the second information are used for determining a first time-frequency resource pool and a second time-frequency resource pool respectively includes the following meaning: the first information and the second information are used for explicitly indicating the first time-frequency resource pool and the second time-frequency resource pool respectively.

In one embodiment, the phrase that the first information and the second information are used for determining a first time-frequency resource pool and a second time-frequency resource pool respectively includes the following meaning: the first information and the second information are used for implicitly indicating the first time-frequency resource pool and the second time-frequency resource pool respectively.

In one embodiment, the phrase that the first information and the second information are used for determining a first time-frequency resource pool and a second time-frequency resource pool respectively includes the following meaning: the first information and the second information are used for explicitly and implicitly indicating the first time-frequency resource pool and the second time-frequency resource pool respectively.

In one embodiment, the phrase that the first information and the second information are used for determining a first time-frequency resource pool and a second time-frequency resource pool respectively includes the following meaning: the first information and the second information are used for implicitly and explicitly indicating the first time-frequency resource pool and the second time-frequency resource pool respectively.

In one embodiment, the first information and the second information are both transmitted through an air interface.

In one embodiment, the first information and the second information are both transmitted through a radio interface.

In one embodiment, the first time-frequency resource pool includes consecutive time domain resources in time domain.

In one embodiment, the first time-frequency resource pool includes discrete time domain resources in time domain.

In one embodiment, the first time-frequency resource pool includes consecutive frequency domain resources in frequency domain.

In one embodiment, the first time-frequency resource pool includes discrete frequency domain resources in frequency domain.

In one embodiment, the second time-frequency resource pool includes consecutive time domain resources in time domain.

In one embodiment, the second time-frequency resource pool includes discrete time domain resources in time domain.

In one embodiment, the second time-frequency resource pool includes consecutive frequency domain resources in frequency domain.

In one embodiment, the second time-frequency resource pool includes discrete frequency domain resources in frequency domain.

In one embodiment, the first time-frequency resource pool and the second time-frequency resource pool are orthogonal.

In one embodiment, the first time-frequency resource pool and the second time-frequency resource pool are non-orthogonal.

In one embodiment, there is one Resource Element (RE) belonging to both the first time-frequency resource pool and the second time-frequency resource pool.

In one embodiment, there is no Resource Element (RE) belonging to both the first time-frequency resource pool and the second time-frequency resource pool.

In one embodiment, any one RE in the first time-frequency resource pool and any one RE in the second time-frequency resource pool occupy different time domain resources in time domain.

In one embodiment, there is one RE in the first time-frequency resource pool that occupies same time domain resources in time domain as one RE in the second time-frequency resource pool.

In one embodiment, the first time-frequency resource pool and the second time-frequency resource pool are Frequency Division Multiplexing (FDM).

In one embodiment, the first time-frequency resource pool and the second time-frequency resource pool are Time Division Multiplexing (TDM).

In one embodiment, the first signal is a baseband signal.

In one embodiment, the first signal is a radio frequency signal.

In one embodiment, the first signal is transmitted through an air interface.

In one embodiment, the first signal is transmitted through a radio interface.

In one embodiment, the first signal is used for random access.

In one embodiment, the first signal is transmitted through a Physical Random Access Channel (PRACH).

In one embodiment, the first signal carries a Msg1 in a 4-Step Random Access procedure.

In one embodiment, the first signal carries a MsgA in a 2-Step Random Access procedure.

In one embodiment, the first signal carries a preamble sequence.

In one embodiment, a pseudorandom sequence is used for generating the first signal.

In one embodiment, a Zadoff-Chu (ZC) sequence is used for generating the first signal.

In one embodiment, a Zadoff-Chu (ZC) sequence in a length of 839 is used for generating the first signal.

In one embodiment, a Zadoff-Chu (ZC) sequence in a length of 139 is used for generating the first signal.

In one embodiment, the first signal includes a Cyclic Prefix (CP), a preamble and a Guard Period (GP).

In one embodiment, the target time-frequency resource block is time-frequency resources occupied by one PRACH occasion.

In one embodiment, the target time-frequency resource block includes consecutive time domain resources.

In one embodiment, the target time-frequency resource block includes consecutive frequency domain resources.

In one embodiment, the target time-frequency resource block includes in time domain time domain resources occupied by a CP, time domain resources occupied by a preamble and time domain resources occupied by a GP.

In one embodiment, the target time-frequency resource block includes free time domain resources in time domain.

In one embodiment, the target time-frequency resource block includes a positive integer number of REs.

In one embodiment, the target time-frequency resource block can only belong to one of the first time-frequency resource pool or the second time-frequency resource pool.

In one embodiment, the target time-frequency resource block belongs to one time-frequency resource pool other than the first time-frequency resource pool or the second time-frequency resource pool.

In one embodiment, each first-type time-frequency resource block included in the first time-frequency resource pool includes consecutive time domain resources in time domain and includes consecutive frequency domain resources in frequency domain.

In one embodiment, each second-type time-frequency resource block included in the second time-frequency resource pool includes consecutive time domain resources in time domain and includes consecutive frequency domain resources in frequency domain.

In one embodiment, the first-type time-frequency resource blocks in the first time-frequency resource pool are periodically distributed in time domain.

In one embodiment, the second-type time-frequency resource blocks in the second time-frequency resource pool are periodically distributed in time domain.

In one embodiment, the phrase that a number of resources occupied in time domain by any one first-type time-frequency resource block in the first time-frequency resource pool is not equal to a number of resources occupied in time domain by any one second-type time-frequency resource block in the second time-frequency resource pool includes the following meaning: a number of Orthogonal Frequency Division Multiplexing (OFDM) symbols occupied in time domain by any one first-type time-frequency resource block in the first time-frequency resource pool is not equal to a number of OFDM symbols occupied in time domain by any one second-type time-frequency resource block in the second time-frequency resource pool.

In one embodiment, the phrase that a number of resources occupied in time domain by any one first-type time-frequency resource block in the first time-frequency resource pool is not equal to a number of resources occupied in time domain by any one second-type time-frequency resource block in the second time-frequency resource pool includes the following meaning: a time interval length occupied in time domain by any one first-type time-frequency resource block in the first time-frequency resource pool is not equal to a time interval length occupied in time domain by any one second-type time-frequency resource block in the second time-frequency resource pool.

In one embodiment, the phrase that a number of resources occupied in time domain by any one first-type time-frequency resource block in the first time-frequency resource pool is not equal to a number of resources occupied in time domain by any one second-type time-frequency resource block in the second time-frequency resource pool includes the following meaning: a PRACH preamble format corresponding to any one first-type time-frequency resource block in the first time-frequency resource pool is not the same as a PRACH preamble format corresponding to any one second-type time-frequency resource block in the second time-frequency resource pool.

In one embodiment, the positioning information of the first communication node includes positioning capability information of the first communication node.

In one embodiment, the positioning information of the first communication node includes whether the first communication can calculate through its own geographical position a distance between the first communication node and the second communication node in the disclosure.

In one embodiment, the positioning information of the first communication node includes whether the first communication can calculate through its own geographical position a distance between the first communication node and the second communication node in the disclosure and an accuracy of the acquired distance.

In one embodiment, the positioning information of the first communication node includes whether the first communication can calculate through its own geographical position a propagation delay between the first communication node and the second communication node in the disclosure.

In one embodiment, the positioning information of the first communication node includes whether the first communication can calculate through its own geographical position a propagation delay between the first communication node and the second communication node in the disclosure and an accuracy of the acquired propagation delay.

In one embodiment, the positioning information of the first communication node includes a positioning method of the first communication node.

In one embodiment, the positioning information of the first communication node includes whether the first communication node supports a Global Navigation Satellite System (GNSS).

In one embodiment, the positioning information of the first communication node includes whether the first communication node supports a Global Navigation Satellite System (GNSS) and a positioning accuracy when supporting the GNSS.

In one embodiment, the positioning information of the first communication node includes a positioning accuracy of the first communication node.

In one embodiment, the positioning information of the first communication node includes whether the first communication node supports a Global Navigation Satellite System (GNSS) and a GNSS type when supporting the GNSS.

In one embodiment, the phrase that positioning information of the first communication node is used for determining a time-frequency resource pool to which the target time-frequency resource block belongs between the first time-frequency resource pool and the second time-frequency resource pool includes the following meaning: whether the first communication node can acquire positioning information of the first communication node is used for determining a time-frequency resource pool to which the target time-frequency resource block belongs between the first time-frequency resource pool and the second time-frequency resource pool.

In one embodiment, the phrase that positioning information of the first communication node is used for determining a time-frequency resource pool to which the target time-frequency resource block belongs between the first time-frequency resource pool and the second time-frequency resource pool includes the following meaning: positioning information of the first communication node is used by the first communication node to determine a time-frequency resource pool to which the target time-frequency resource block belongs between the first time-frequency resource pool and the second time-frequency resource pool.

In one embodiment, the phrase that positioning information of the first communication node is used for determining a time-frequency resource pool to which the target time-frequency resource block belongs between the first time-frequency resource pool and the second time-frequency resource pool includes the following meaning: positioning information of the first communication node is used for determining a time-frequency resource pool to which the target time-frequency resource block belongs between the first time-frequency resource pool and the second time-frequency resource pool based on a mapping condition.

In one embodiment, the phrase that positioning information of the first communication node is used for determining a time-frequency resource pool to which the target time-frequency resource block belongs between the first time-frequency resource pool and the second time-frequency resource pool includes the following meaning: whether the first communication has a positioning capability is used for determining a time-frequency resource pool to which the target time-frequency resource block belongs between the first time-frequency resource pool and the second time-frequency resource pool.

In one embodiment, the phrase that positioning information of the first communication node is used for determining a time-frequency resource pool to which the target time-frequency resource block belongs between the first time-frequency resource pool and the second time-frequency resource pool includes the following meaning: whether the first communication node can acquire positioning information of the first communication node is used for determining whether the target time-frequency resource block belongs to the first time-frequency resource pool or the second time-frequency resource pool.

In one embodiment, the phrase that positioning information of the first communication node is used for determining a time-frequency resource pool to which the target time-frequency resource block belongs between the first time-frequency resource pool and the second time-frequency resource pool includes the following meaning: positioning information of the first communication node is used for determining whether the target time-frequency resource block belongs to the first time-frequency resource pool or the second time-frequency resource pool.

Embodiment 2

Figure 2:
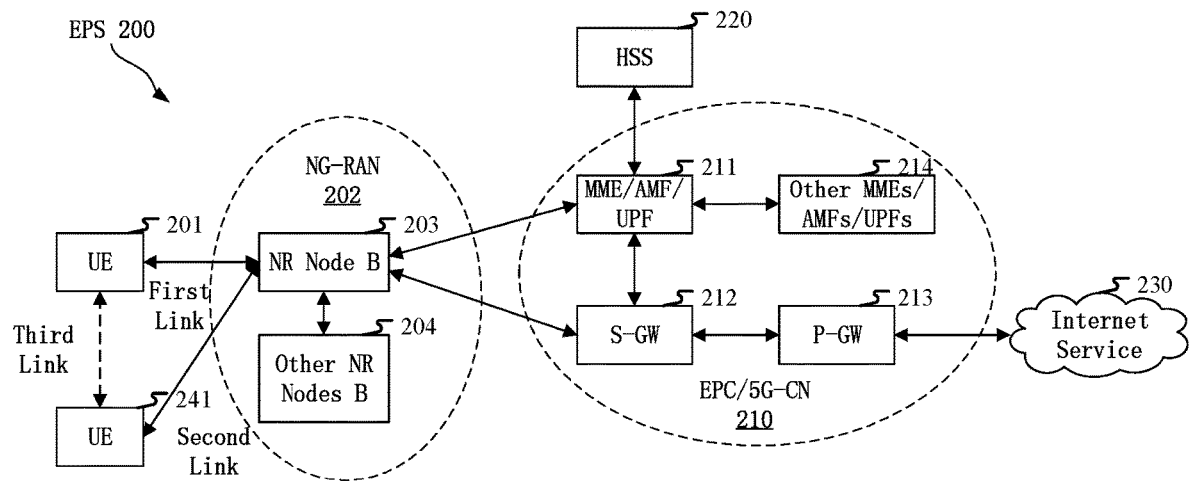
FIG. 2 is a diagram illustrating a network architecture according to one embodiment of the disclosure.

Embodiment 2 illustrates a diagram of a network architecture according to the disclosure, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 may be a satellite or a terrestrial base station repeated through a satellite. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including interne, intranet, and IP Multimedia Subsystems (IMSs).

In one embodiment, the UE 201 corresponds to the first communication node in the disclosure.

In one embodiment, the UE 201 supports the transmission in an NTN.

In one embodiment, the UE 201 supports the transmission in a large-delay network.

In one embodiment, the gNB 203 corresponds to the second communication node in the disclosure.

In one embodiment, the gNB 203 supports the transmission in an NTN.

In one embodiment, the gNB 203 supports the transmission in a large-delay network.

Embodiment 3

Figure 3:
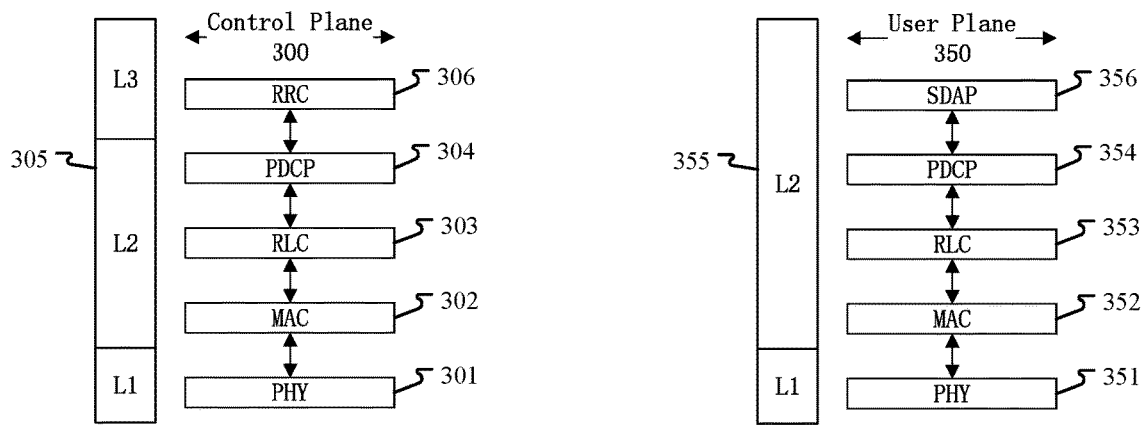
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node (UE, gNB or satellite or aircraft in NTN) and a second communication node (gNB, UE or satellite or aircraft in NTN) or between two UEs is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first communication node and the second communication node and between two UEs over the PHY 301. The L2 Layer 305 includes a Medium Access Control (MAC) sublayer 302, a Radio Link Control (RLC) sublayer 303, and a Packet Data Convergence Protocol (PDCP) sublayer 304, which are terminated at the second communication node. The PDCP sublayer 304 provides multiplexing between different radio bearers and logical channels. The PDCP sublayer 304 also provides security by encrypting packets and provides support for handover of the first communication node between second communication nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first communication nodes. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node and the first communication node. The radio protocol architecture of the user plane 350 includes a Layer 1 (L1 layer) and a Layer 2 (L2 layer); the radio protocol architecture for the first communication node and the second communication node in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node may include several higher layers above the L2 Layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the first communication node in the disclosure.

In one embodiment, the radio protocol architecture shown in FIG. 3 is applicable to the second communication node in the disclosure.

In one embodiment, the first information in the disclosure is generated on the RRC 306.

In one embodiment, the first information in the disclosure is generated on the MAC 302 or MAC 352.

In one embodiment, the first information in the disclosure is generated on the PHY 301 or PHY 351.

In one embodiment, the second information in the disclosure is generated on the RRC 306.

In one embodiment, the second information in the disclosure is generated on the MAC 302 or MAC 352.

In one embodiment, the second information in the disclosure is generated on the PHY 301 or PHY 351.

In one embodiment, the first signal in the disclosure is generated on the MAC 302 or MAC 352.

In one embodiment, the first signal in the disclosure is generated on the PHY 301 or PHY 351.

In one embodiment, the target sequence in the disclosure is generated on the PHY 301 or PHY 351.

In one embodiment, the third information in the disclosure is generated on the RRC 306.

In one embodiment, the third information in the disclosure is generated on the MAC 302 or MAC 352.

In one embodiment, the third information in the disclosure is generated on the PHY 301 or PHY 351.

In one embodiment, the first signaling in the disclosure is generated on the RRC 306.

In one embodiment, the first signaling in the disclosure is generated on the MAC 302 or MAC 352.

In one embodiment, the first signaling in the disclosure is generated on the PHY 301 or PHY 351.

In one embodiment, the second signal in the disclosure is generated on the RRC 306.

In one embodiment, the second signal in the disclosure is generated on the MAC 302 or MAC 352.

In one embodiment, the second signal in the disclosure is generated on the PHY 301 or PHY 351.

In one embodiment, the fourth information in the disclosure is generated on the RRC 306.

In one embodiment, the fourth information in the disclosure is generated on the MAC 302 or MAC 352.

In one embodiment, the fourth information in the disclosure is generated on the PHY 301 or PHY 351.

Embodiment 4

Figure 4:
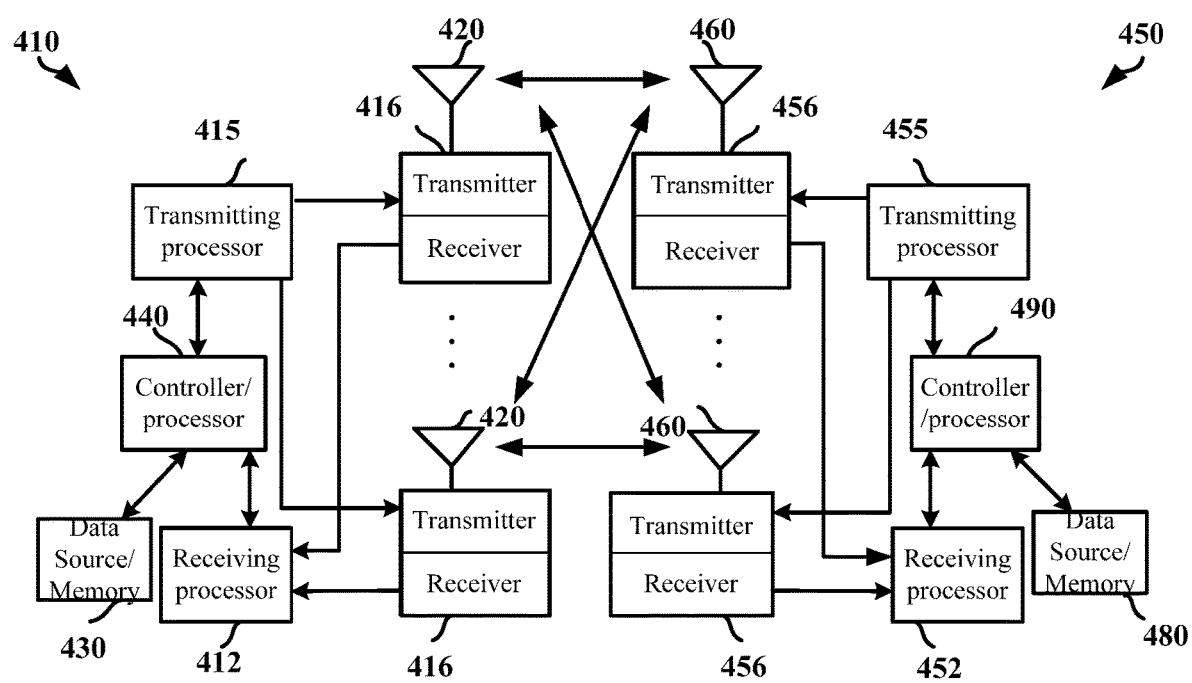
FIG. 4 is a diagram illustrating a first communication node and a second communication node according to one embodiment of the disclosure.

Embodiment 4 illustrates a diagram of a first communication node and a second communication node according to the disclosure, as shown in FIG. 4.

The first communication node 450 includes a controller/processor 490, a data source/buffer 480, a receiving processor 452, a transmitter/receiver 456 and a transmitting processor 455, the transmitter/receiver 456 including an antenna 460. The data source/buffer 480 provides a higher-layer packet to the controller/processor 490. The controller/processor 490 provides header compression/decompression, encryption/deencryption, packet segmentation and reordering, multiplexing and de-multiplexing between a logical channel and a transport channel, to implement L2 or above protocols of the user plane and the control plane. The higher-layer packet may include data or control information, for example, DL-SCH or UL-SCH or SL-SCH. The transmitting processor 455 performs various signal transmitting processing functions used for L1 layer (that is, PHY), including encoding, interleaving, scrambling, modulation, power control/allocation, precoding, and generation of physical layer control signalings. The receiving processor 452 performs various signal receiving processing functions used for L1 layer (that is, PHY), including decoding, de-interleaving, descrambling, demodulation, de-precoding, and extraction of physical layer control signalings, etc. The transmitter 456 is configured to convert the baseband signal provided by the transmitting processor 455 into a radio-frequency signal and transmit the radio-frequency signal via the antenna 460. The receiver 456 converts a radio-frequency signal received via the corresponding antenna 460 into a baseband signal and provides the baseband signal to the receiving processor 452.

The second communication node 410 includes a controller/processor 440, a data source/buffer 430, a receiving processor 412, transmitter/receiver 416 and a transmitting processor 415, the transmitter/receiver 416 including an antenna 420. The data source/buffer 430 provides a higher-layer packet to the controller/processor 440. The controller/processor 440 provides header compression/decompression, encryption/deencryption, packet segmentation and reordering, multiplexing and de-multiplexing between a logical channel and a transport channel, to implement L2 protocols of the user plane and the control plane. The higher-layer packet may include data or control information, for example, DL-SCH or UL-SCH or SL-SCH. The transmitting processor 415 performs various signal transmitting processing functions used for L1 layer (that is, PHY), including encoding, interleaving, scrambling, modulation, power control/allocation, precoding, and generation of physical layer control signalings. The receiving processor 412 performs various signal receiving processing functions used for L1 layer (that is, PHY), including decoding, de-interleaving, descrambling, demodulation, de-precoding, and extraction of physical layer control signalings, etc. The transmitter 416 is configured to convert the baseband signal provided by the transmitting processor 415 into a radio-frequency signal and transmit the radio-frequency signal via the antenna 420. The receiver 416 converts a radio-frequency signal received via the corresponding antenna 420 into a baseband signal and provides the baseband signal to the receiving processor 412.

In Downlink (DL) transmission, a higher-layer packet (for example, higher-layer information included in the first information, the second information, the third information and the first signaling in the disclosure) is provided to the controller/processor 440. The controller/processor 440 provides functions of L2 layer and above layers. In DL transmission, the controller/processor 440 provides header compression, encryption, packet segmentation and reordering, multiplexing between a logical channel and a transport channel, and a radio resource allocation for the first communication node 450 based on various priorities. The controller/processor 440 is also in charge of HARQ operation, retransmission of a lost packet, and a signaling to the first communication node 450, for example, higher-layer information included in the first information, the second information, the third information and the first signaling in the disclosure (if included) are all generated in the controller/processor 440. The transmitting processor 415 performs various signal processing functions used for L1 layer (that is, physical layer), including encoding, interleaving, scrambling, modulation, power control/allocation, precoding, and generation of physical layer control signalings; physical layer signals of the first information, the second information, the third information and the first signaling in the disclosure are generated at the transmitting processor 415. The generated modulation signals are divided into parallel streams. Each of the parallel streams is mapped into a corresponding multi-carrier subcarrier and/or multi-carrier symbol and then is mapped to an antenna 420 by the transmitting processor 415 via the transmitter 416 to transmit in the form of RF signal. At the receiving side, every receiver 456 receives a signal via the corresponding antenna 460. Every receiver 456 recovers baseband information modulated to the RF carrier and provides the baseband information to a receiving processor 452. The receiving processor 452 performs signal receiving processing functions of L1 layer. The signal receiving processing functions include receptions of physical layer signals of the first information, the second information, the third information and the first signaling in the disclosure; multicarrier symbols in the multicarrier symbol streams are demodulated corresponding to different modulation schemes (for example, BPSK and QPSK), and then are decoded and deinterleaved to recover the data or control signals on a physical channel transmitted by the gNB 410, then the data and control signals are provided to the controller/processor 490. The controller/processor 490 implements functions of L2 layer and above layers, and the controller/processor 490 interprets the higher-layer information included in the first information, the second information, the third information and the first signaling in the disclosure (if included). The controller/processor may be connected to a memory 480 that stores program codes and data. The memory 480 may be a computer readable medium.

In Uplink (UL) transmission, the data source/buffer 480 provides higher-layer data to the controller/processor 490. The data source/buffer 480 illustrates L2 layer and all protocol layers above L2 layer. The controller/processor 490 provides header compression, encryption, packet segmentation and reordering, and multiplexing between a logical channel and a transport channel based on configurations of the second communication node 410 so as to provide the functions of L2 layer used for the control plane and user plane. The controller/processor 490 is also in charge of HARQ operation, retransmission of lost packets, and signalings to the second communication node 410. The first signal in the disclosure is generated at the controller/processor 490, and the second signal is generated at the data source/buffer 480. The transmitting processor 455 performs various signal transmitting processing functions used for L1 layer (that is, PHY). Physical layer signals of the first signal and the second signal in the disclosure are generated at the transmitting processor 455. The signal transmitting processing functions include encoding and interleaving so as to ensure FEC (Forward Error Correction) at the UE 450 and demodulating baseband signals corresponding to different modulation schemes (i.e., BPSK, QPSK). The modulated symbols are split into parallel streams and each stream is mapped to corresponding multicarrier subcarriers and/or multicarrier symbols, and then the transmitting processor 455 maps it to the antenna 460 via the transmitter 456 to transmit out in form of RF signal. The receiver 416 receives an RF signal via the corresponding antenna 420; each receiver 416 recovers the baseband information modulated onto the RF carrier and provides the baseband information to the receiving processor 412. The receiving processor 412 performs various signal receiving processing functions used for L1 layer, including receiving physical layer signals of the first signal and the second signal in the disclosure; the signal receiving processing functions include acquiring multicarrier symbol streams, and then demodulating the multicarrier symbols in the multicarrier symbol streams corresponding to different modulation schemes (for example, BPSK and QPSK), and then decoding and de-interleaving to recover the data or control signals on a physical channel originally transmitted by the first communication node 450, then the data and control signals are provided to the controller/processor 440. The controller/processor 440 implements functions of L2 layer, including interpreting the information carried in the first signal and the second signal in the disclosure (including the fourth information in the disclosure). The controller/processor may be connected to the buffer 430 that stores program codes and data. The buffer 430 may be a computer readable medium.

In one embodiment, the first communication node 450 includes at least one processor and at least one memory. The at least one memory includes computer program codes. The at least one memory and the computer program codes are configured to be used in collaboration with the at least one processor. The first communication node 450 at least receives first information and receives second information, the first information and the second information being used for determining a first time-frequency resource pool and a second time-frequency resource pool respectively, and transmits a first signal, the first signal occupying a target time-frequency resource block; wherein the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, the first communication node 450 includes a memory that stores a computer readable instruction program. The computer readable instruction program generates an action when executed by at least one processor. The action includes receiving first information and receiving second information, the first information and the second information being used for determining a first time-frequency resource pool and a second time-frequency resource pool respectively, and transmitting a first signal, the first signal occupying a target time-frequency resource block; wherein the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, the second communication node 410 includes at least one processor and at least one memory. The at least one memory includes computer program codes. The at least one memory and the computer program codes are configured to be used in collaboration with the at least one processor. The second communication node 410 at least transmits first information and transmits second information, the first information and the second information being used for determining a first time-frequency resource pool and a second time-frequency resource pool respectively, and receives a first signal, the first signal occupying a target time-frequency resource block; wherein the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, the second communication node 410 includes a memory that stores a computer readable instruction program. The computer readable instruction program generates an action when executed by at least one processor. The action includes: transmitting first information and transmitting second information, the first information and the second information being used for determining a first time-frequency resource pool and a second time-frequency resource pool respectively, and receiving a first signal, the first signal occupying a target time-frequency resource block; wherein the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, the first communication node 450 is one UE.

In one embodiment, the first communication node 450 is one UE supporting large delay.

In one embodiment, the first communication node 450 is one UE supporting NTN.

In one embodiment, the first communication node 450 is one aircraft.

In one embodiment, the second communication node 410 is one base station (gNB/eNB).

In one embodiment, the second communication node 410 is one base station supporting large delay.

In one embodiment, the second communication node 410 is one base station supporting NTN.

In one embodiment, the second communication node 410 is one satellite.

In one embodiment, the second communication node 410 is one flying platform.

In one embodiment, the receiver 456 (including antenna 460), the receiving processor 452 and the controller/processor 490 are used for receiving the first information in the disclosure.

In one embodiment, the receiver 456 (including antenna 460), the receiving processor 452 and the controller/processor 490 are used for receiving the second information in the disclosure.

In one embodiment, the transmitter 456 (including antenna 460), the transmitting processor 455 and the controller/processor 490 are used for transmitting the first signal in the disclosure.

In one embodiment, the receiver 456 (including antenna 460), the receiving processor 452 and the controller/processor 490 are used for receiving the first signaling in the disclosure.

In one embodiment, the receiver 456 (including antenna 460), the receiving processor 452 and the controller/processor 490 are used for receiving the third information in the disclosure.

In one embodiment, the transmitter 456 (including antenna 460), the transmitting processor 455 and the controller/processor 490 are used for transmitting the second signal in the disclosure.

In one embodiment, the transmitter 416 (including antenna 420), the transmitting processor 415 and the controller/processor 440 are used for transmitting the first information in the disclosure.

In one embodiment, the transmitter 416 (including antenna 420), the transmitting processor 415 and the controller/processor 440 are used for transmitting the second information in the disclosure.

In one embodiment, the receiver 416 (including antenna 420), the receiving processor 412 and the controller/processor 440 are used for receiving the first signal in the disclosure.

In one embodiment, the transmitter 416 (including antenna 420), the transmitting processor 415 and the controller/processor 440 are used for transmitting the first signaling in the disclosure.

In one embodiment, the transmitter 416 (including antenna 420), the transmitting processor 415 and the controller/processor 440 are used for transmitting the third information in the disclosure.

In one embodiment, the receiver 416 (including antenna 420), the receiving processor 412 and the controller/processor 440 are used for receiving the second signal in the disclosure.

Embodiment 5

Figure 5:
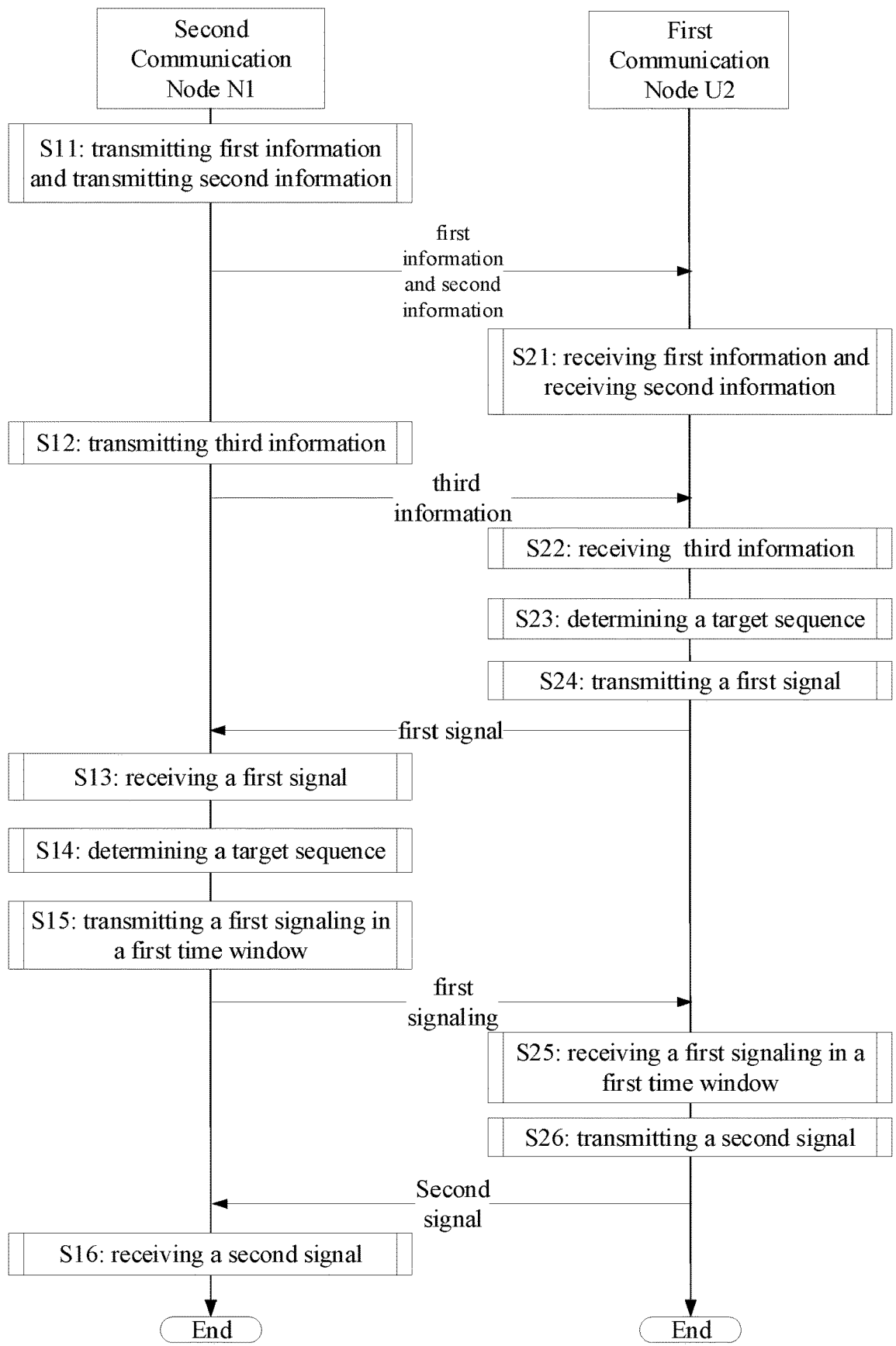
FIG. 5 is a flowchart of transmission of a signal according to one embodiment of the disclosure.

Embodiment 5 illustrates a flowchart of transmission of a radio signal according to one embodiment of the disclosure, as shown in FIG. 5. In FIG. 5, a second communication node N1 is a maintenance base station for a serving cell of a first communication node U2. It should be noted that the order in this example does not limit the signal transmission order and the implementation order in the disclosure.

The second communication node N1 transmits first information and transmits second information in S11, transmits third information in S12, receives a first signal in S13, determines a target sequence in S14, transmits a first signaling in a first time window in S15, and receives a second signal in S16.

The first communication node U2 receives first information and receives second information in S21, receives third information in S22, determines a target sequence in S23, transmits a first signal in S24, receives a first signaling in a first time window in S25, and transmits a second signal in S26.

In Embodiment 5, the first information and the second information in the disclosure are used for determining a first time-frequency resource pool and a second time-frequency resource pool respectively; the first signal in the disclosure occupies a target time-frequency resource block; the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool; when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1; the third information is used for determining X candidate sequences, and X is a positive integer greater than 1; the target sequence is one of the X candidate sequences, and the first communication node selects the target sequence among the X candidate sequences randomly; a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window out of the Y candidate time windows; the second signal carries fourth information, and the fourth information is used for indicating a positioning capability of the first communication node.

In one embodiment, the second signal includes a Msg3.

In one embodiment, the second signal includes a MsgA.

In one embodiment, the second signal is transmitted through a data channel in Step 1 in a 2-Step Random Access procedure.

In one embodiment, the second signal is a Physical Uplink Shared Channel (PUSCH) in a MsgA.

In one embodiment, the second signal carries a retransmission of one Msg3.

In one embodiment, the second signal carries an initial transmission of one Msg3.

In one embodiment, the second signal carries a retransmission of one MsgB.

In one embodiment, the second signal carries an initial transmission of one MsgB.

In one embodiment, the second signal is transmitted through an Uplink Shared Channel (UL-SCH).

In one embodiment, the second signal is transmitted through a Physical Uplink Shared Channel (PUSCH).

In one embodiment, output bits of Low Density Parity Check Code (LDPC) channel coding of one Transport Block (TB) are used for generating the first signal.

In one embodiment, time-frequency resources occupied by the second signal are related to at least one of a position of time domain resources included in the target time-frequency resource block in time domain, a position of frequency domain resources included in the target time-frequency resource block in frequency domain, or the first sequence.

In one embodiment, the second signal is a baseband signal.

In one embodiment, the second signal is a radio frequency signal.

In one embodiment, the second signal is transmitted through a radio interface.

In one embodiment, the second signal is transmitted through an air interface.

In one embodiment, the fourth information includes a Msg3.

In one embodiment, the fourth information includes a MsgB.

In one embodiment, the fourth information is transmitted through a higher layer signaling.

In one embodiment, the fourth information is transmitted through a physical layer signaling.

In one embodiment, the fourth information includes part or all of one higher layer signaling.

In one embodiment, the fourth information includes part or all of one RRC signaling.

In one embodiment, the fourth information includes part or all of one MAC signaling.

In one embodiment, the fourth information includes part or all of one MAC Control Element (CE).

In one embodiment, the fourth information includes part or all of one MAC header.

In one embodiment, the phrase that the fourth information is used for indicating a positioning capability of the first communication node includes the following meaning: the fourth information is used for directly indicating a positioning capability of the first communication node.

In one embodiment, the phrase that the fourth information is used for indicating a positioning capability of the first communication node includes the following meaning: the fourth information is used for indirectly indicating a positioning capability of the first communication node.

In one embodiment, the phrase that the fourth information is used for indicating a positioning capability of the first communication node includes the following meaning: the fourth information is used for explicitly indicating a positioning capability of the first communication node.

In one embodiment, the phrase that the fourth information is used for indicating a positioning capability of the first communication node includes the following meaning: the fourth information is used for implicitly indicating a positioning capability of the first communication node.

In one embodiment, the positioning capability of the first communication node refers to whether the first communication node supports a GNSS.

In one embodiment, the positioning capability of the first communication node refers to a positioning accuracy of the first communication node.

In one embodiment, the positioning capability of the first communication node refers to whether the first communication node supports a GNSS and a GNSS type when supporting the GNSS.

Embodiment 6

Figure 6:
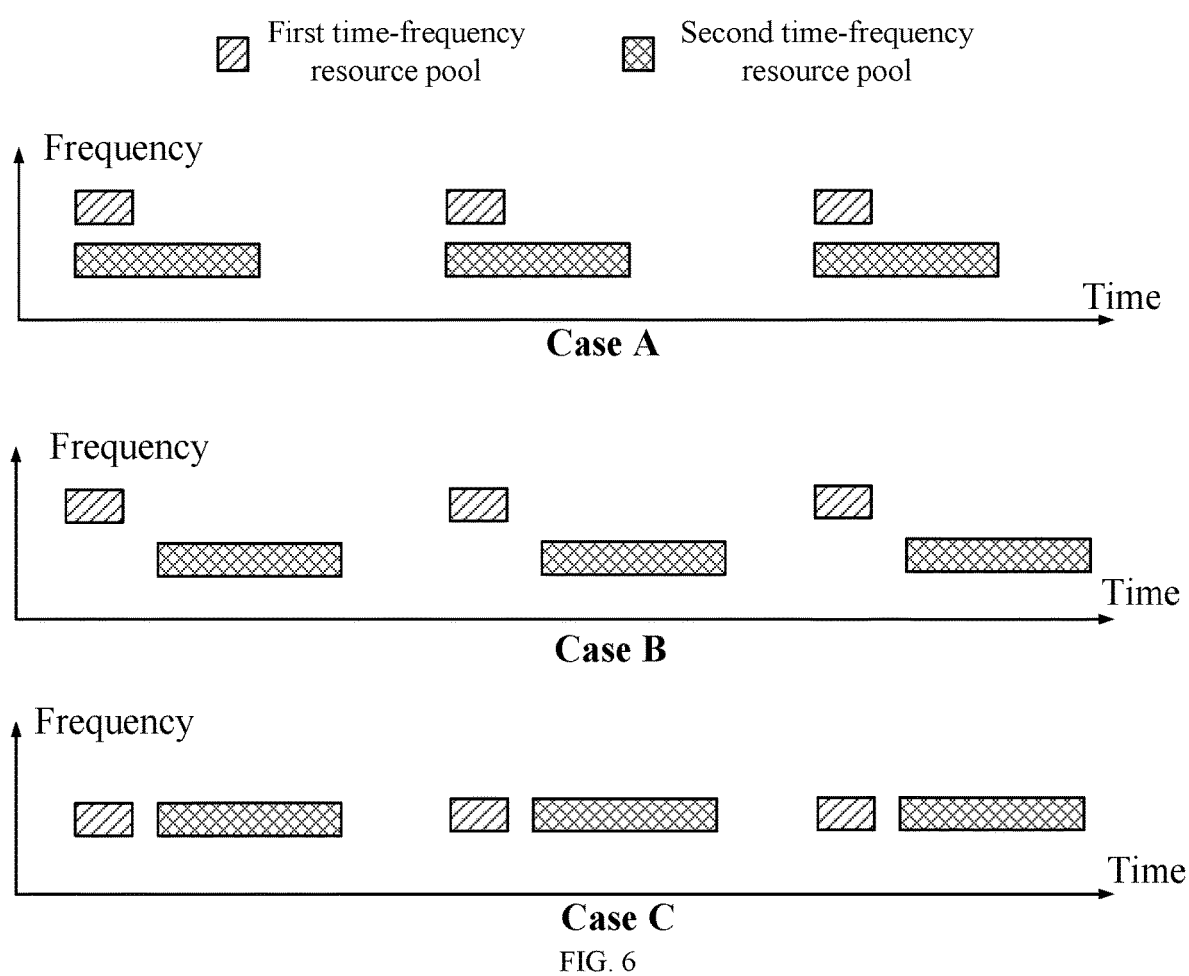
FIG. 6 is a diagram illustrating a relationship between a first time-frequency resource pool and a second time-frequency resource pool according to one embodiment of the disclosure.

Embodiment 6 illustrates a diagram of a relationship between a first time-frequency resource pool and a second time-frequency resource pool according to one embodiment of the disclosure, as shown in FIG. 6. In FIG. 6, the horizontal axis represents time, the longitudinal axis represents frequency, each rectangle filled with slashes represents one first-type time-frequency resource block in a first time-frequency resource pool, each rectangle filled with cross lines represents one second-type time-frequency resource block in a second time-frequency resource pool; in case A, the first time-frequency resource pool and the second time-frequency resource pool are FDM, but their occupied time domain resources are non-orthogonal; in case B, the first time-frequency resource pool and the second time-frequency resource pool are TDM and FDM, the first time-frequency resource pool and the second time-frequency resource pool are orthogonal in both time domain and frequency domain; in case C, the first time-frequency resource pool and the second time-frequency resource pool are TDM, but their occupied frequency domain resources are non-orthogonal.

In Embodiment 6, the first time-frequency resource pool and the second time-frequency resource pool in the disclosure are orthogonal, the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool.

Embodiment 7

Figure 7:
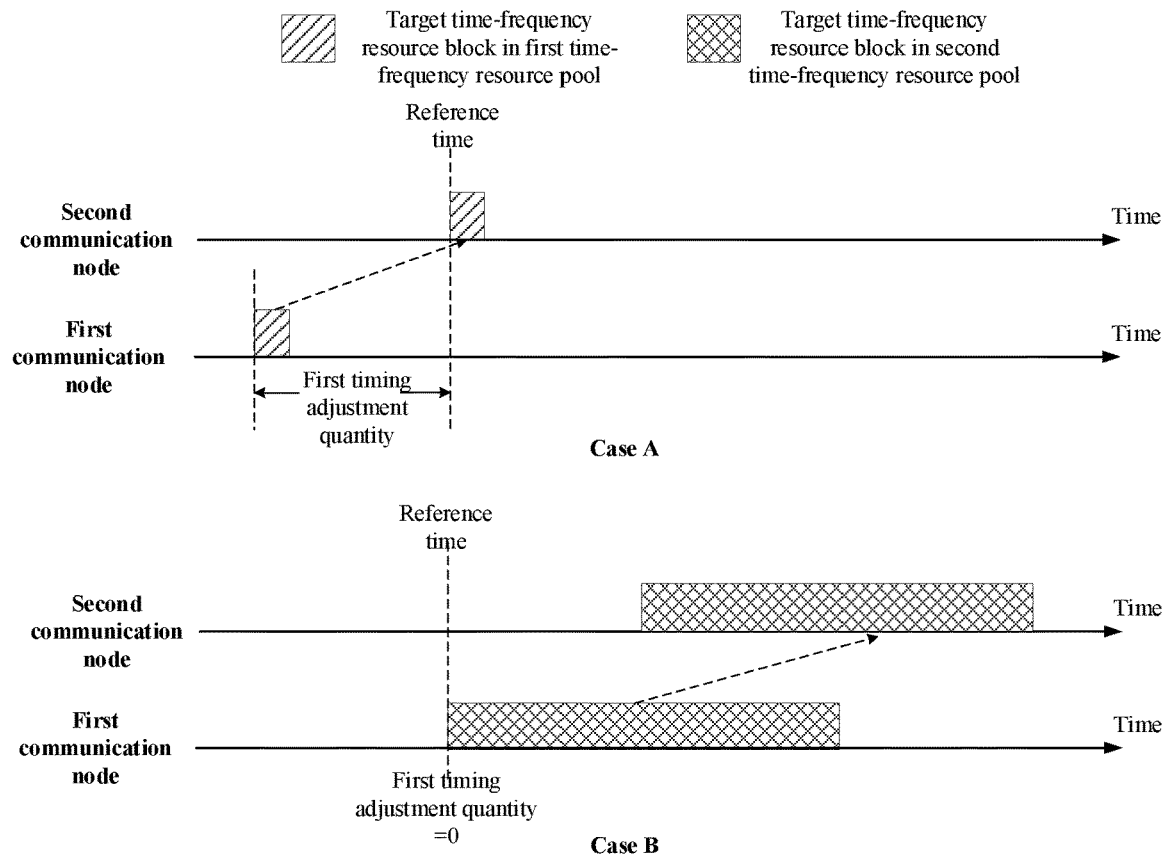
FIG. 7 is a diagram illustrating a first timing adjustment quantity according to one embodiment of the disclosure.

Embodiment 7 illustrates a diagram of a first timing adjustment quantity according to one embodiment of the disclosure, as shown in FIG. 7. In FIG. 7, the horizontal axis represents time, a rectangle filled with slashes represents a target time-frequency resource block in a first time-frequency resource pool, and a rectangle filled with cross lines represents a target time-frequency resource block in a second time-frequency resource pool.

In Embodiment 7, an absolute value of a time difference between a start time of transmitting the first signal in the disclosure and a reference time is equal to a first timing adjustment quantity, and a receive timing of the first communication node in the disclosure is used for determining the reference time; when the target time-frequency resource block in the disclosure belongs to the first time-frequency resource pool in the disclosure, the first timing adjustment quantity is greater than 0; and when the target time-frequency resource block belongs to the second time-frequency resource pool in the disclosure, the first timing adjustment quantity is equal to 0.

In one embodiment, the first timing adjustment quantity is used for determining a transmitting timing of the first signal.

In one embodiment, the first timing adjustment quantity is a non-negative real number.

In one embodiment, the first timing adjustment quantity is in unit of microsecond.

In one embodiment, the first timing adjustment quantity is in unit of second.

In one embodiment, the first timing adjustment quantity is equal to a value of Timing Advance (TA) of the transmission of the first signal.

In one embodiment, the first timing adjustment quantity is equal to a time advance of a start time of transmitting the first signal relative to a boundary of one downlink slot.

In one embodiment, the first timing adjustment quantity is equal to a non-negative integer number of $T_c$, where $T_c=1/(480\cdot10^3\cdot4096)$ seconds.

In one embodiment, when the first timing adjustment quantity is greater than 0, the first timing adjustment quantity is related to a type of the second communication node in the disclosure.

In one embodiment, when the first timing adjustment quantity is greater than 0, the first timing adjustment quantity is related to a height of the second communication node in the disclosure.

In one embodiment, when the first timing adjustment quantity is greater than 0, the first timing adjustment quantity is related to a type of a satellite to which the second communication node in the disclosure belongs.

In one embodiment, the reference time is a time of a boundary of one downlink slot.

In one embodiment, the reference time is a time of a boundary of one OFDM symbol.

In one embodiment, the reference time is a time of a boundary of one subframe.

In one embodiment, the start time of transmitting the first signal is not later than the reference time.

In one embodiment, the first information in the disclosure and a receive timing of the first communication node are used together for determining the reference time.

In one embodiment, the first information in the disclosure indicates a virtual time-frequency resource pool, and an absolute value of a time difference in time domain between time-frequency resources in the virtual time-frequency resource pool and in the first time-frequency resource pool is equal to the first timing adjustment quantity.

In one embodiment, the first information in the disclosure indicates a virtual time-frequency resource pool, and the first time-frequency resource pool is obtained after the virtual time-frequency resource pool is advanced by the first timing adjustment quantity in time domain In one embodiment, the first information in the disclosure indicates an expected receiving time-frequency resource pool corresponding to a transmission in the first time-frequency resource pool, and an absolute value of a time difference in time domain between time-frequency resources in the expected receiving time-frequency resource pool and in the first time-frequency resource pool is equal to the first timing adjustment quantity.

In one embodiment, the first information in the disclosure and a receive timing of the first communication node are used for determining a receiving start time of the first signal, and the reference time is equal to the receiving start time of the first signal.

In one embodiment, the first information in the disclosure indicates a receiving start time of the first signal which is calculated according to a receive timing of the first communication node, and the reference time is equal to the receiving start time of the first signal which is calculated according to the receive timing of the first communication node.

In one embodiment, the phrase that a receive timing of the first communication node is used for determining the reference time includes the following meaning: a receive timing of the first communication node is used by the first communication node to determine the reference time In one embodiment, a receive timing of the first communication node includes a position of a boundary of a downlink slot in time domain and an index of the downlink slot.

In one embodiment, a receive timing of the first communication node includes a position of a boundary of a downlink subframe in time domain and an index of the downlink subframe.

In one embodiment, a receive timing of the first communication node includes a position of a boundary of a downlink system frame in time domain and an index of the downlink system frame.

In one embodiment, a receive timing of the first communication node includes a position of a boundary of a downlink system frame in time domain, a position of a boundary of a downlink subframe in time domain, a position of a boundary of a downlink slot in time domain, an index of the downlink system frame, an index of the downlink subframe and an index of the downlink slot.

In one embodiment, the first communication node acquires a receive timing of the first communication node through cell search.

In one embodiment, the first communication node acquires a receive timing of the first communication node through downlink synchronization.

In one embodiment, the first communication node acquires a receive timing of the first communication node through receiving a downlink synchronization signal.

Embodiment 8

Figure 8:
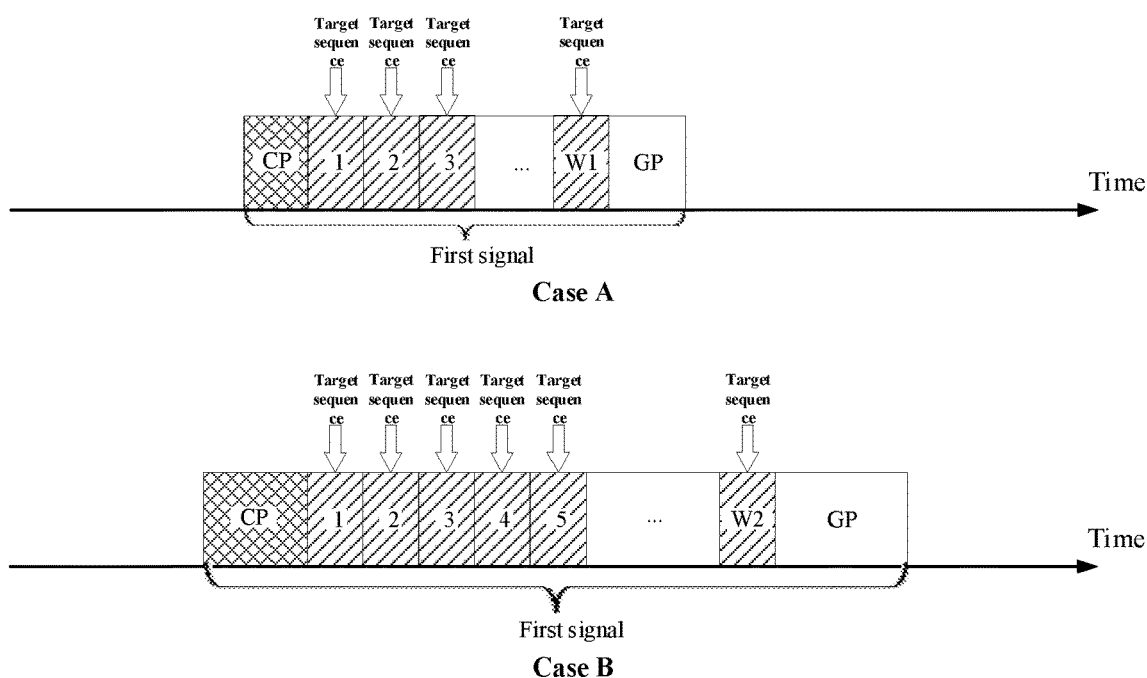
FIG. 8 is a diagram illustrating a relationship between a target sequence and a first signal according to one embodiment of the disclosure.

Embodiment 8 illustrates a diagram of a relationship between a target sequence and a first signal according to one embodiment of the disclosure, as shown in FIG. 8. In FIG. 8, the horizontal axis represents time, each rectangle filled with slashes represents one time of transmission of the target sequence, a rectangle filled with cross lines represents a Cyclic Prefix (CP), and a blank rectangle represents a Guard Period (GP).

In Embodiment 8, when the target time-frequency resource block in the disclosure belongs to the first time-frequency resource pool in the disclosure, the target sequence in the disclosure is repeated W1 time(s) to generate the first signal in the disclosure; when the target time-frequency resource block in the disclosure belongs to the second time-frequency resource pool in the disclosure, the target sequence in the disclosure is repeated W2 time(s) to generate the first signal in the disclosure; W1 is a positive integer, and W2 is a positive integer not equal to W1.

In one embodiment, the target sequence is a preamble sequence.

In one embodiment, the target sequence is a random access preamble sequence.

In one embodiment, the target sequence is one of 64 preamble sequences.

In one embodiment, the target sequence is a ZC sequence.

In one embodiment, the target sequence is generated by a ZC sequence through transformation.

In one embodiment, the target sequence is a ZC sequence with a length equal to 839.

In one embodiment, the target sequence is a ZC sequence with a length equal to 139.

In one embodiment, the phrase that the target sequence is repeated W1 time(s) to generate the first signal includes the following meaning: the target sequence is repeated W1 time(s) in time domain to generate the first signal.

In one embodiment, the phrase that the target sequence is repeated W1 time(s) to generate the first signal includes the following meaning: the target sequence is used for generating a target sub-signal, and the target sub-signal is repeated W1 time(s) in time domain to generate the first signal.

In one embodiment, the phrase that the target sequence is repeated W1 time(s) to generate the first signal includes the following meaning: the target sequence is used for generating a target sub-signal, and the target sub-signal is repeated W1 time(s) in time domain and then is added with a CP to generate the first signal.

In one embodiment, the phrase that the target sequence is repeated W1 time(s) to generate the first signal includes the following meaning: the target sequence experiences in sequence Mapping to Physical Resources and OFDM BaseBand Signal Generation to obtain the first signal, during the OFDM BaseBand Signal Generation process the first signal is composed of a CP and a target sub-signal repeated W1 time(s) in time domain, and the target sequence is used for generating the target sub-signal.

In one embodiment, when the target time-frequency resource block belongs to the first time-frequency resource pool, W1 is equal to $N_u/(2041\kappa \cdot 2^{-\mu})$ corresponding to a preamble format employed by the first signal, where $\kappa=64$, $\mu \in \{0,1,2,3\}$.

In one embodiment, when the target time-frequency resource block belongs to the first time-frequency resource pool, W1 is equal to $N_u/(24576\kappa)$ corresponding to a preamble format employed by the first signal, where $\kappa=64$.

In one embodiment, when the target time-frequency resource block belongs to the first time-frequency resource pool, W1 is equal to $N_u/(6144\kappa)$ corresponding to a preamble format employed by the first signal, where $\kappa=64$.

In one embodiment, the phrase that the target sequence is repeated W2 time(s) to generate the first signal includes the following meaning: the target sequence is repeated W2 time(s) in time domain to generate the first signal.

In one embodiment, the phrase that the target sequence is repeated W2 time(s) to generate the first signal includes the following meaning: the target sequence is used for generating a target sub-signal, and the target sub-signal is repeated W2 time(s) in time domain to generate the first signal.

In one embodiment, the phrase that the target sequence is repeated W2 time(s) to generate the first signal includes the following meaning: the target sequence is used for generating a target sub-signal, and the target sub-signal is repeated W2 time(s) in time domain and then is added with a CP to generate the first signal.

In one embodiment, the phrase that the target sequence is repeated W2 time(s) to generate the first signal includes the following meaning: the target sequence experiences in sequence Mapping to Physical Resources and OFDM BaseBand Signal Generation to obtain the first signal, during the OFDM BaseBand Signal Generation process the first signal is composed of a CP and a target sub-signal repeated W2 time(s) in time domain, and the target sequence is used for generating the target sub-signal.

In one embodiment, when the target time-frequency resource block belongs to the second time-frequency resource pool, W2 is equal to $N_u/(2048\kappa \cdot 2^{-\mu})$ corresponding to a preamble format employed by the first signal, where $\kappa=64$, $\mu \in \{0,1,2,3\}$.

In one embodiment, when the target time-frequency resource block belongs to the second time-frequency resource pool, W2 is equal to $N_u/(24576\kappa)$ corresponding to a preamble format employed by the first signal, where $\kappa=64$.

In one embodiment, when the target time-frequency resource block belongs to the second time-frequency resource pool, W2 is equal to $N_{zt}/(6144\kappa)$ corresponding to a preamble format employed by the first signal, where $\kappa=64$.

In one embodiment, W1 is greater than W2.
In one embodiment, W1 is less than W2.
In one embodiment, W1 is equal to 1.
In one embodiment, W1 is greater than 1.
In one embodiment, W2 is equal to 1.
In one embodiment, W2 is greater than 1.

Embodiment 9

Figure 9:
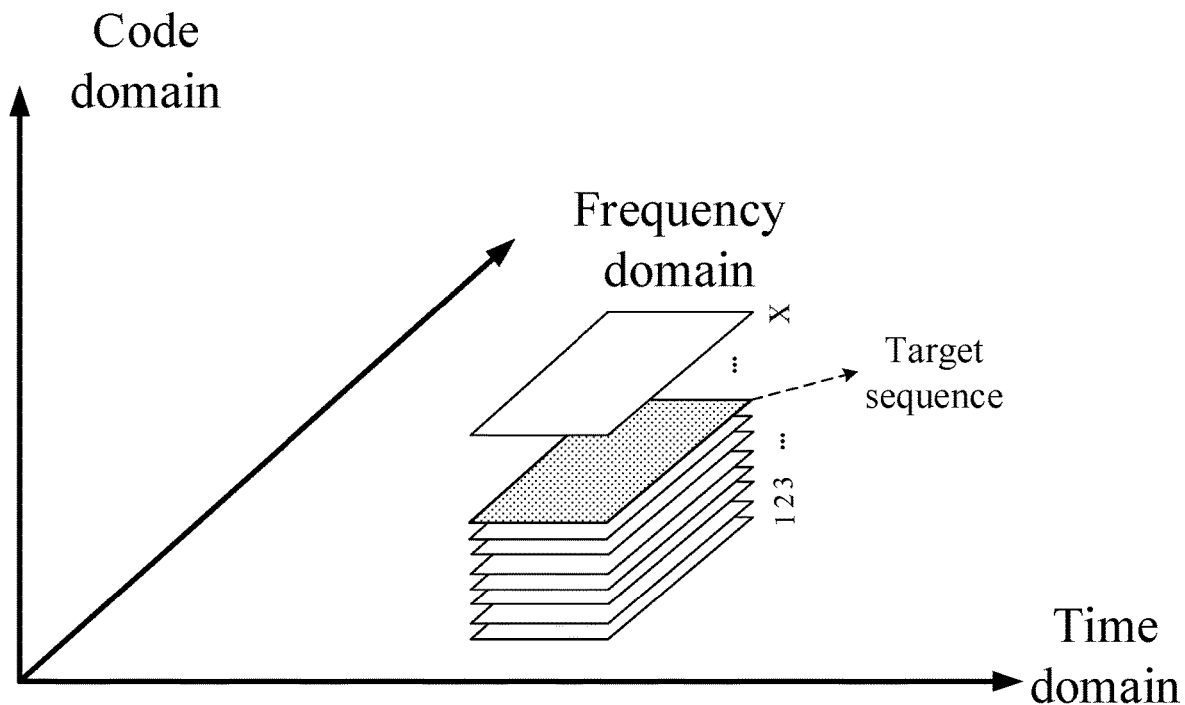
FIG. 9 is a diagram illustrating X candidate sequences according to one embodiment of the disclosure.

Embodiment 9 illustrates a diagram of X candidate sequences according to one embodiment of the disclosure, as shown in FIG. 9. In FIG. 9, the horizontal lateral axis represents time domain, the horizontal longitudinal axis represents frequency domain, and the vertical direct axis represents code domain, a rectangle with filling represents a target sequence, and each blank rectangle represents one of X candidate sequences other than the target sequence.

In Embodiment 9, the third information in the disclosure is used for determining X candidate sequences, and X is a positive integer greater than 1; the target sequence in the disclosure is one of the X candidate sequences, and the first communication node in the disclosure selects the target sequence among the X candidate sequences randomly.

In one embodiment, X is equal to 64.
In one embodiment, X is less than 64.
In one embodiment, X is greater than 64.
In one embodiment, any one of the X candidate sequences is a preamble sequence.
In one embodiment, any one of the X candidate sequences is a random access preamble sequence.
In one embodiment, any one of the X candidate sequences is one of 64 preamble sequences.
In one embodiment, any one of the X candidate sequences is a ZC sequence.
In one embodiment, any one of the X candidate sequences is generated by a ZC sequence through transformation.
In one embodiment, any one of the X candidate sequences is a ZC sequence with a length equal to 839.
In one embodiment, any one of the X candidate sequences is a ZC sequence with a length equal to 139.
In one embodiment, the third information is transmitted through a higher layer signaling.
In one embodiment, the third information is transmitted through a physical layer signaling.
In one embodiment, the third information includes part or all of one higher layer signaling.
In one embodiment, the third information includes part or all of one physical layer signaling.
In one embodiment, the third information includes part or all IEs in one Radio Resource Control (RRC) signaling.
In one embodiment, the third information includes part or all fields in one IE in one RRC signaling.
In one embodiment, the third information includes part or all fields in one Medium Access Control (MAC) layer signaling.
In one embodiment, the third information includes part or all of one System Information Block (SIB).
In one embodiment, the third information includes part or all of one MAC Control Element (CE).
In one embodiment, the third information includes part or all of one MAC header.
In one embodiment, the third information is transmitted through one Downlink Shared Channel (DL-SCH).
In one embodiment, the third information is transmitted through one Physical Downlink Shared Channel (PDSCH).
In one embodiment, the third information is related to a coverage of the second communication node in the disclosure.
In one embodiment, the third information is related to a height of the second communication node in the disclosure.
In one embodiment, the third information is related to a type of the second communication node in the disclosure.
In one embodiment, the third information is related to an angle of tilt of the second communication node in the disclosure relative to the first communication node in the disclosure.
In one embodiment, the third information is related to a size of a coverage of the second communication node in the disclosure.
In one embodiment, the third information is broadcast.
In one embodiment, the third information is cell specific.
In one embodiment, the third information is UE specific.
In one embodiment, the third information is UE group specific.
In one embodiment, the third information is geographical area specific.
In one embodiment, the third information includes part or all fields in one Downlink Control Information (DCI) signaling.
In one embodiment, the third information includes higher layer information "prach-RootSequenceIndex".
In one embodiment, the third information includes higher layer information "restrictedSetConfig".
In one embodiment, the phrase that the third information is used for determining X candidate sequences includes the following meaning: the third information is used by the first communication node to determine the X candidate sequences.
In one embodiment, the phrase that the third information is used for determining X candidate sequences includes the following meaning: the third information is used for directly determining the X candidate sequences.
In one embodiment, the phrase that the third information is used for determining X candidate sequences includes the following meaning: the third information is used for indirectly determining the X candidate sequences.
In one embodiment, the phrase that the third information is used for determining X candidate sequences includes the following meaning: the third information is used for explicitly determining the X candidate sequences.
In one embodiment, the phrase that the third information is used for determining X candidate sequences includes the following meaning: the third information is used for implicitly determining the X candidate sequences.

Embodiment 10

Figure 10:
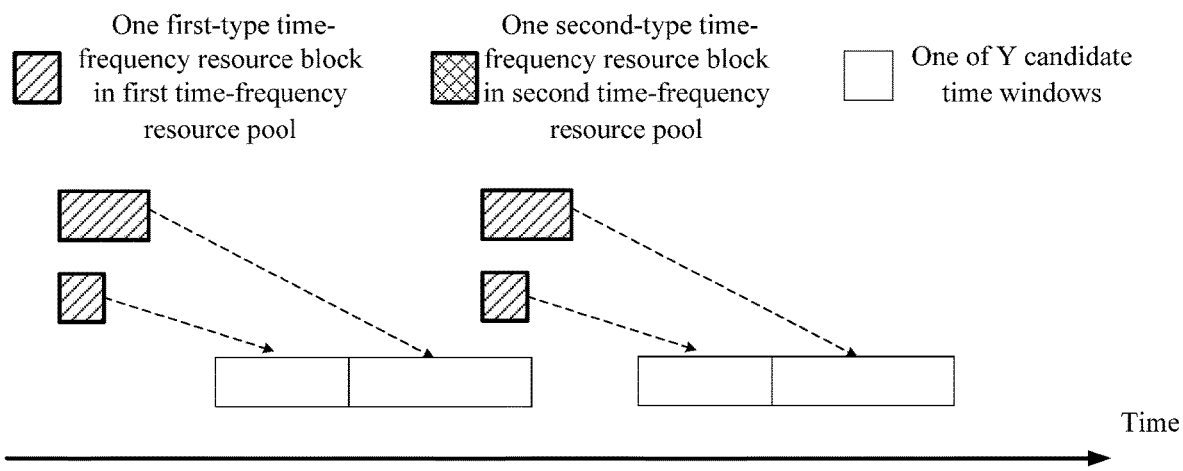
FIG. 10 is a diagram illustrating Y candidate time windows according to one embodiment of the disclosure.

Embodiment 10 illustrates a diagram of Y candidate time windows according to one embodiment of the disclosure, as shown in FIG. 10. In FIG. 10, the horizontal axis represents time, each rectangle filled with slashes represents one first-type time-frequency resource block in a first time-frequency resource pool, each rectangle filled with cross lines represents one second-type time-frequency resource block in a second time-frequency resource pool, and each blank rectangle represents one of Y candidate time windows.

In Embodiment 10, a position of the target time-frequency resource block in the disclosure in time-frequency domain is used for determining a first signature ID, and the first signaling in the disclosure carries the first signature ID; the first time window in the disclosure is one of Y candidate time windows, Y is a positive integer greater than 1, and any two of the Y candidate time windows are orthogonal; and a time-frequency resource pool to which the target time-frequency resource block in the disclosure belongs is used for determining the first time window out of the Y candidate time windows.

In one embodiment, the first time window includes a positive integer number of consecutive slots in one given subcarrier spacing.

In one embodiment, the first time window includes a positive integer number of consecutive multicarrier symbols (OFDM symbols) in one given subcarrier spacing.

In one embodiment, the first time window includes a positive integer number of consecutive subframes.

In one embodiment, a start time and an end time of the first time window are aligned to a boundary of a downlink multicarrier symbol.

In one embodiment, a start time and an end time of the first time window are aligned to a boundary of a downlink slot in one given subcarrier spacing.

In one embodiment, the first time window is a Random Access Response (RAR) window.

In one embodiment, the first time window is used for monitoring of a Msg2 in a 4-Step Random Access procedure.

In one embodiment, the first time window is used for monitoring of a MsgB in a 2-Step Random Access procedure.

In one embodiment, the first signaling is transmitted through an air interface.

In one embodiment, the first signaling is transmitted through a radio interface.

In one embodiment, the first signaling is transmitted through a Uu interface.

In one embodiment, the first signaling is a physical layer signaling.

In one embodiment, the first signaling is transmitted through a Physical Downlink Control Channel (PDCCH).

In one embodiment, the first signaling includes part or all fields in a DCI.

In one embodiment, the first signaling includes part or all fields in a DCI with a given DIC format.

In one embodiment, the first signaling includes part or all fields in a DCI with a DCI format 1-0.

In one embodiment, the first signaling is transmitted in a Common Search Space (CSS).

In one embodiment, the first signaling is a DCI scheduling a PDSCH carrying a random access response.

In one embodiment, the first signaling is a PDCCH scheduling a PDSCH carrying a random access response.

In one embodiment, the first signaling is a DCI scheduling a PDSCH carrying a MsgB.

In one embodiment, the first signaling is a PDCCH scheduling a PDSCH carrying a MsgB.

In one embodiment, the first signature ID is one non-negative integer.

In one embodiment, the first signature ID is one Radio Network Temporary Identity (RNTI).

In one embodiment, the first signature ID is one Random Access Radio Network Temporary Identity (RA-RNTI).

In one embodiment, the first signature ID is equal to one hexadecimal integer from FFF0 to FFFD.

In one embodiment, the phrase that a position of the target time-frequency resource block in time-frequency domain is used for determining a first signature ID includes the following meaning: a position of the target time-frequency resource block in time-frequency domain is used by the first communication node in the disclosure to determine the first signature ID.

In one embodiment, the phrase that a position of the target time-frequency resource block in time-frequency domain is used for determining a first signature ID includes the following meaning: an index of an earliest OFDM symbol in time domain included in the target time-frequency resource block within a slot to which the earliest OFDM symbol belongs is used for determining the first signature ID.

In one embodiment, the phrase that a position of the target time-frequency resource block in time-frequency domain is used for determining a first signature ID includes the following meaning: an index of a slot to which an earliest OFDM symbol in time domain included in the target time-frequency resource block belongs within one system frame is used for determining the first signature ID.

In one embodiment, the phrase that a position of the target time-frequency resource block in time-frequency domain is used for determining a first signature ID includes the following meaning: an index of an earliest OFDM symbol in time domain included in the target time-frequency resource block within a slot to which the earliest OFDM symbol belongs is used for determining the first signature ID, and an index of a slot to which an earliest OFDM symbol in time domain included in the target time-frequency resource block belongs within one system frame is used for determining the first signature ID.

In one embodiment, the phrase that a position of the target time-frequency resource block in time-frequency domain is used for determining a first signature ID includes the following meaning: an index of one Physical Resource Block (PRB) in frequency domain included in the target time-frequency resource block is used for determining a first signature ID.

In one embodiment, the phrase that a position of the target time-frequency resource block in time-frequency domain is used for determining a first signature ID includes the following meaning: an index of a Physical Resource Block (PRB) with a lowest frequency in frequency domain included in the target time-frequency resource block is used for determining a first signature ID.

In one embodiment, the phrase that a position of the target time-frequency resource block in time-frequency domain is used for determining a first signature ID includes the following meaning: an index of a Physical Resource Block (PRB) with a highest frequency in frequency domain included in the target time-frequency resource block is used for determining a first signature ID.

In one embodiment, the phrase that a position of the target time-frequency resource block in time-frequency domain is used for determining a first signature ID includes the following meaning: an index of one Physical Resource Block (PRB) group in frequency domain included in the target time-frequency resource block is used for determining a first signature ID.

In one embodiment, the phrase that the first signaling carries the first signature ID includes: a CRC included in the first signaling carries the first signature ID.

In one embodiment, the phrase that the first signaling carries the first signature ID includes: a payload of the first signaling carries the first signature ID.

In one embodiment, the phrase that the first signaling carries the first signature ID includes: a check bit of the first signaling carries the first signature ID.

In one embodiment, the phrase that the first signaling carries the first signature ID includes: a CRC of the first signaling is scrambled with the first signature ID.

In one embodiment, any one of the Y candidate time windows has a time length greater than 0.

In one embodiment, two of the Y candidate time windows have different time lengths.

In one embodiment, any two of the Y candidate time windows have an equal time length.

In one embodiment, the phrase that any two of the Y candidate time windows are orthogonal includes the following meaning: any two of the Y candidate time windows are non-overlapped.

In one embodiment, the phrase that any two of the Y candidate time windows are orthogonal includes the following meaning: there is no time domain RE belonging to two of the Y candidate time windows simultaneously.

In one embodiment, the phrase that any two of the Y candidate time windows are orthogonal includes the following meaning: there is no OFDM symbol belonging to two of the Y candidate time windows simultaneously.

In one embodiment, the phrase that a time-frequency resource pool to which the target time-frequency resource block belongs is used for determining the first time window out of the Y candidate time windows includes the following meaning: whether the target time-frequency resource block belongs to the first time-frequency resource pool or the second time-frequency resource pool is used for determining the first time window out of the Y candidate time windows.

In one embodiment, the phrase that a time-frequency resource pool to which the target time-frequency resource block belongs is used for determining the first time window out of the Y candidate time windows includes the following meaning: Y is equal to 2, the first time-frequency resource pool and the second time-frequency resource pool correspond to Y candidate time windows respectively, and the first time window is a candidate time window corresponding to the time-frequency resource pool to which the target time-frequency resource block belongs.

In one embodiment, the phrase that a time-frequency resource pool to which the target time-frequency resource block belongs is used for determining the first time window out of the Y candidate time windows includes the following meaning: the Y candidate time windows are divided into two groups of candidate time windows, and the two groups of candidate time windows correspond to the first time-frequency resource pool and the second time-frequency resource pool respectively; the first time window belongs to one of the two groups of candidate time windows that is corresponding to the time-frequency resource pool to which the target time-frequency resource block belongs.

In one embodiment, a transmitting end time of the first signal is used for determining a start time of the first time window.

In one embodiment, Y is equal to 2.

In one embodiment, Y is greater than 2.

Embodiment 11

Figure 11:
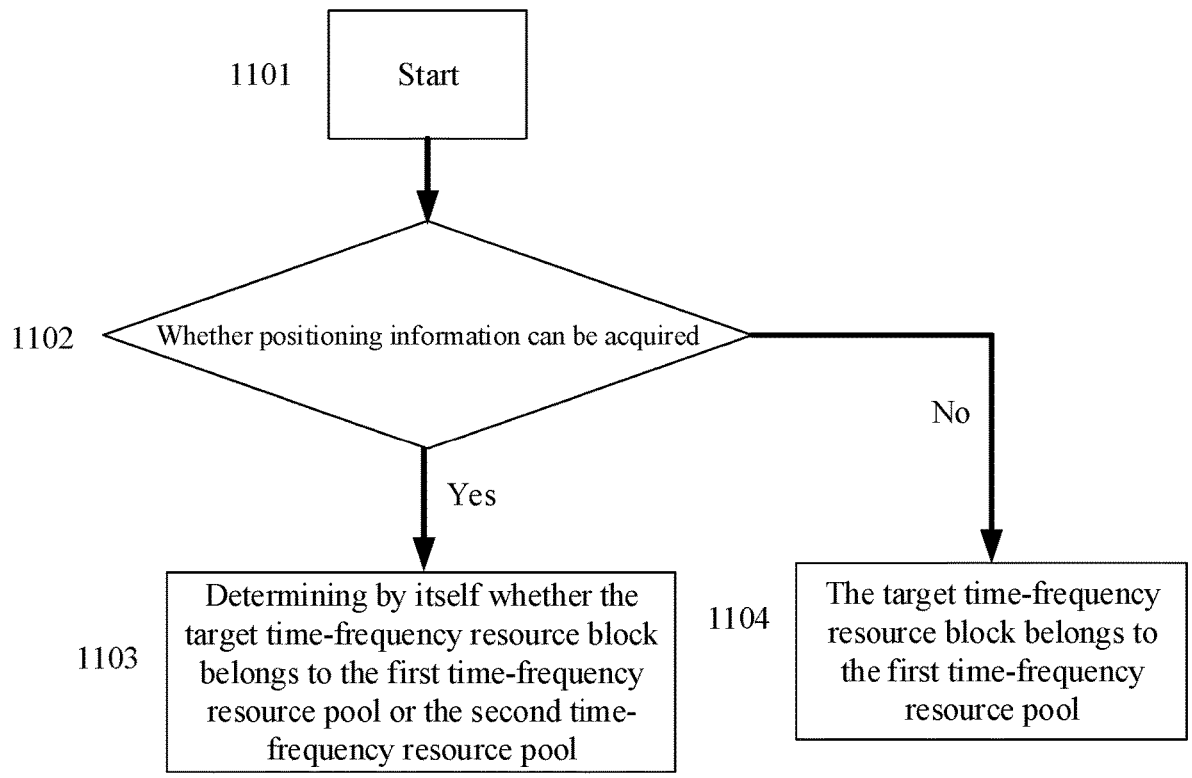
FIG. 11 is a diagram illustrating a relationship between a target time-frequency resource block and first and second time-frequency resource pools according to one embodiment of the disclosure.

Embodiment 11 illustrates a diagram of a relationship between a target time-frequency resource block and first and second time-frequency resource pools according to one embodiment of the disclosure, as shown in FIG. 11. In FIG. 11, each rectangle represents one action, and each rhombus represents one judgement. In FIG. 11, starting from 1101, judging whether positioning information can be acquired in 1102, determining by itself whether the target time-frequency resource block belongs to the first time-frequency resource pool or the second time-frequency resource pool in 1103, and determining that the target time-frequency resource block belongs to the first time-frequency resource pool in 1104.

In Embodiment 11, when the first communication node in the disclosure can acquire the positioning information of the first communication node, the first communication node determines by itself a time-frequency resource pool to which the target time-frequency resource block in the disclosure belongs between the first time-frequency resource pool in the disclosure and the second time-frequency resource pool in the disclosure; when the first communication node cannot acquire the positioning information of the first communication node, the target time-frequency resource block belongs to the first time-frequency resource pool.

In one embodiment, the phrase that the first communication node can acquire the positioning information of the first communication node refers that: the first communication node has a positioning capability.

In one embodiment, the phrase that the first communication node can acquire the positioning information of the first communication node refers that: the first communication node supports a GNSS.

In one embodiment, the phrase that the first communication node can acquire the positioning information of the first communication node refers that: the first communication node has a positioning capability and the positioning accuracy meets a threshold.

In one embodiment, the phrase that the first communication node cannot acquire the positioning information of the first communication node refers that: the first communication node does not have a positioning capability.

In one embodiment, the phrase that the first communication node cannot acquire the positioning information of the first communication node refers that: the first communication node does not support a GNSS.

In one embodiment, the phrase that the first communication node cannot acquire the positioning information of the first communication node refers that: the first communication node has a positioning capability but the positioning accuracy of the first communication node cannot meet a threshold.

In one embodiment, the phrase that the first communication node determines by itself a time-frequency resource pool to which the target time-frequency resource block belongs between the first time-frequency resource pool and the second time-frequency resource pool includes the following meaning: the first communication node determines by itself between the first time-frequency resource pool and the second time-frequency resource pool whether the target time-frequency resource block belongs to the first time-frequency resource pool or the second time-frequency resource pool.

In one embodiment, the phrase that the first communication node determines by itself a time-frequency resource pool to which the target time-frequency resource block belongs between the first time-frequency resource pool and the second time-frequency resource pool includes the following meaning: the first communication node determines equiprobably between the first time-frequency resource pool and the second time-frequency resource pool whether the target time-frequency resource block belongs to the first time-frequency resource pool or the second time-frequency resource pool.

In one embodiment, the phrase that the first communication node determines by itself a time-frequency resource pool to which the target time-frequency resource block belongs between the first time-frequency resource pool and the second time-frequency resource pool includes the following meaning: the first communication node self-decides to determine between the first time-frequency resource pool and the second time-frequency resource pool whether the target time-frequency resource block belongs to the first time-frequency resource pool or the second time-frequency resource pool.

Embodiment 12

Figure 12:
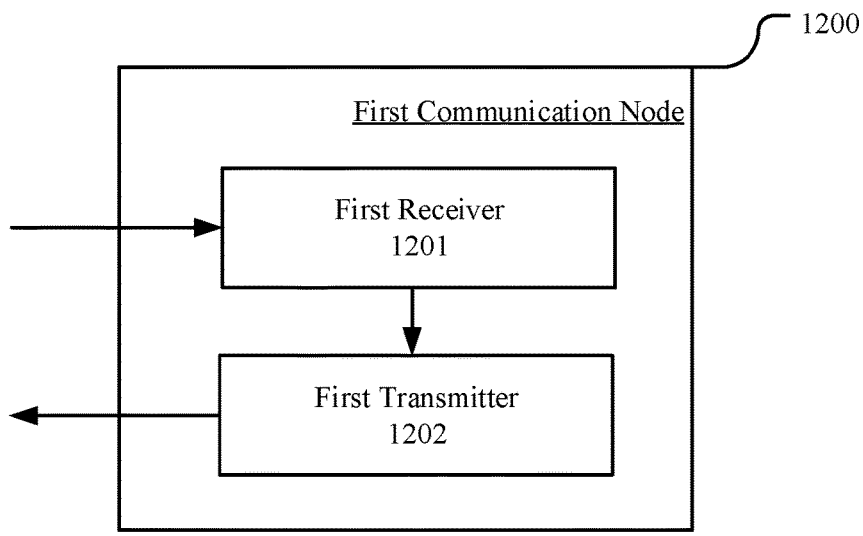
FIG. 12 is a structure block diagram of a processing device in a first communication node according to one embodiment of the disclosure.

Embodiment 12 illustrates a structure block diagram of a processing device in a first communication node, as shown in FIG. 12. In FIG. 12, the processing device 1200 in the first communication node includes a first receiver 1201 and a first transmitter 1202. The first receiver 1201 includes the transmitter/receiver 456 (including antenna 460), the receiving processor 452 and the controller/processor 490 illustrated in FIG. 4 in the disclosure; and the first transmitter 1202 includes the transmitter/receiver 456 (including antenna 460), the transmitting processor 455 and the controller/processor 490 illustrated in FIG. 4 in the disclosure.

In Embodiment 12, the first receiver 1201 receives first information and receives second information, the first information and the second information being used for determining a first time-frequency resource pool and a second time-frequency resource pool respectively; the first transmitter 1202 transmits a first signal, the first signal occupying a target time-frequency resource block; wherein the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, an absolute value of a time difference between a start time of transmitting the first signal and a reference time is equal to a first timing adjustment quantity, and a receive timing of the first communication node is used for determining the reference time; when the target time-frequency resource block belongs to the first time-frequency resource pool, the first timing adjustment quantity is greater than 0; and when the target time-frequency resource block belongs to the second time-frequency resource pool, the first timing adjustment quantity is equal to 0.

In one embodiment, the first transmitter 1202 determines a target sequence; wherein when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1.

In one embodiment, the first transmitter 1202 determines a target sequence; wherein when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1; the first receiver 1201 receives third information; wherein the third information is used for determining X candidate sequences, and X is a positive integer greater than 1; the target sequence is one of the X candidate sequences, and the first communication node selects the target sequence among the X candidate sequences randomly.

In one embodiment, the first receiver 1201 receives a first signaling in a first time window; wherein a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window out of the Y candidate time windows.

In one embodiment, the first transmitter 1202 transmits a second signal; wherein the second signal carries fourth information, and the fourth information is used for indicating a positioning capability of the first communication node.

In one embodiment, when the first communication node can acquire the positioning information of the first communication node, the first communication node determines by itself a time-frequency resource pool to which the target time-frequency resource block belongs between the first time-frequency resource pool and the second time-frequency resource pool; when the first communication node cannot acquire the positioning information of the first communication node, the target time-frequency resource block belongs to the first time-frequency resource pool.

Embodiment 13

Figure 13:
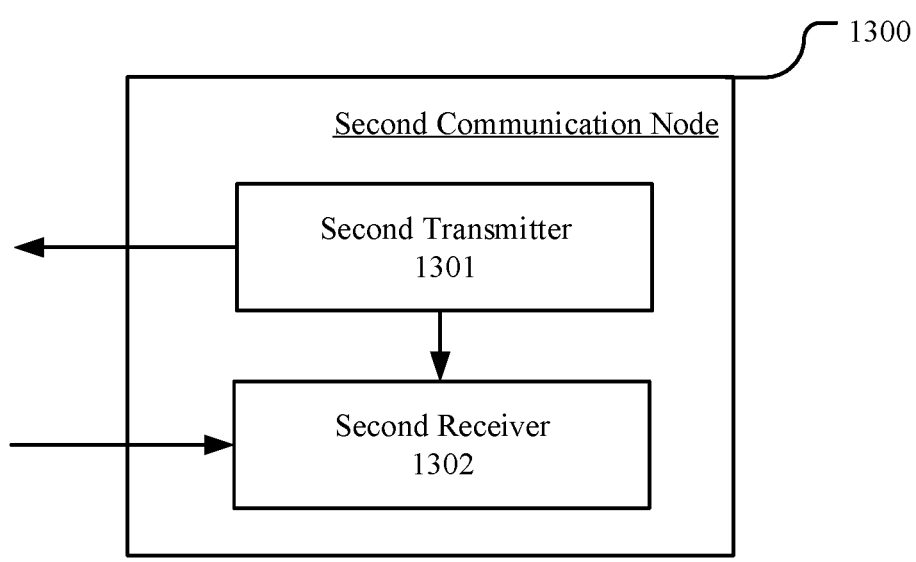
FIG. 13 is a structure block diagram of a processing device in a second communication node according to one embodiment of the disclosure.

Embodiment 13 illustrates a structure block diagram of a processing device in a second communication node, as shown in FIG. 13. In FIG. 13, the processing device 1300 in the second communication node includes a second transmitter 1301 and a second receiver 1302. The second transmitter 1301 includes the transmitter/receiver 416 (including antenna 420), the transmitting processor 415 and the controller/processor 440 illustrated in FIG. 4 in the disclosure; and the second receiver 1302 includes the transmitter/receiver 416 (including antenna 420), the receiving processor 412 and the controller/processor 440 illustrated in FIG. 4 in the disclosure.

In Embodiment 13, the second transmitter 1301 transmits first information and transmits second information, the first information and the second information being used for determining a first time-frequency resource pool and a second time-frequency resource pool respectively; and the second receiver 1302 receives a first signal, the first signal occupying a target time-frequency resource block; wherein the first time-frequency resource pool includes a positive integer number of first-type time-frequency resource block(s), and the second time-frequency resource pool includes a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block included in the first time-frequency resource pool, or the target time-frequency resource block is one second-type time-frequency resource block included in the second time-frequency resource pool; and positioning information of the first communication node is used for determining a time-frequency resource pool to which the target time-frequency resource block belongs between the first time-frequency resource pool and the second time-frequency resource pool.

In one embodiment, an absolute value of a time difference between a start time of transmitting the first signal and a reference time is equal to a first timing adjustment quantity, and a receive timing of the first communication node is used for determining the reference time; when the target time-frequency resource block belongs to the first time-frequency resource pool, the first timing adjustment quantity is greater than 0; and when the target time-frequency resource block belongs to the second time-frequency resource pool, the first timing adjustment quantity is equal to 0.

In one embodiment, the second receiver 1302 determines a target sequence; wherein when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1.

In one embodiment, the second receiver 1302 determines a target sequence; wherein when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1; the second transmitter 1301 transmits third information; wherein the third information is used for determining X candidate sequences, and X is a positive integer greater than 1; the target sequence is one of the X candidate sequences, and the first communication node selects the target sequence among the X candidate sequences randomly.

In one embodiment, the second transmitter 1301 transmits a first signaling in a first time window; wherein a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window out of the Y candidate time windows.

In one embodiment, the second receiver 1302 receives a second signal; wherein the second signal carries fourth information, and the fourth information is used for indicating a positioning capability of the first communication node.

In one embodiment, when the first communication node can acquire the positioning information of the first communication node, the first communication node determines by itself a time-frequency resource pool to which the target time-frequency resource block belongs between the first time-frequency resource pool and the second time-frequency resource pool; when the first communication node cannot acquire the positioning information of the first communication node, the target time-frequency resource block belongs to the first time-frequency resource pool.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first-type communication node or the UE or the terminal in the disclosure includes but not limited to mobile phones, tablet computers, laptops, network cards, low-power equipment, enhanced MTC (eMTC) equipment, NB-IoT equipment, vehicle-mounted communication equipment, aircrafts, airplanes, unmanned aerial vehicles, tele-controlled aircrafts, and other wireless communication equipment. The second-type communication node or base station or network side equipment in the disclosure includes but not limited to macro-cellular base stations, micro-cellular base stations, home base stations, relay base station, eNB, gNB, TRP, relay satellites, satellite base stations, air base stations and other wireless communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first communication node for wireless communications, comprising:
 a first receiver, to receive first information and to receive second information, the first information and the second information being used for determining a first time-frequency resource pool and a second time-frequency resource pool respectively; and
 a first transmitter, to transmit a first signal, the first signal occupying a target time-frequency resource block, the first signal is used for random access;
 wherein the first time-frequency resource pool comprises a positive integer number of first-type time-frequency resource block(s), and the second time-frequency resource pool comprises a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block comprised in the first time-frequency resource pool, or the target time-frequency resource block is one second-type time-frequency resource block comprised in the second time-frequency resource pool; and positioning information of the first communication node is used for determining a time-frequency resource pool to which the target time-frequency resource block belongs between the first time-frequency resource pool and the second time-frequency resource pool; an absolute value of a time difference between a start time of transmitting the first signal and a reference time is equal to a first timing adjustment quantity, and a receive timing of the first communication node is used for determining the reference time; when the target time-frequency resource block belongs to the first time-frequency resource pool, the first timing adjustment quantity is greater than 0; and when the target time-frequency resource block belongs to the second time-frequency resource pool, the first timing adjustment quantity is equal to 0.

2. The first communication node according to claim 1, wherein the first transmitter determines a target sequence; when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1.

3. The first communication node according to claim 2, wherein the first receiver receives third information; the third information is used for determining X candidate sequences, and X is a positive integer greater than 1; the target sequence is one of the X candidate sequences, and the first communication node selects the target sequence among the X candidate sequences randomly.

4. The first communication node according to claim 1, wherein the first receiver receives a first signaling in a first time window; a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window out of the Y candidate time windows.

5. The first communication node according to claim 1, wherein the first transmitter transmits a second signal; the second signal carries fourth information, and the fourth information is used for indicating a positioning capability of the first communication node.

6. The first communication node according to claim 1, when the first communication node can acquire the positioning information of the first communication node, the first communication node determines by itself a time-frequency resource pool to which the target time-frequency resource block belongs between the first time-frequency resource pool and the second time-frequency resource pool; when the first communication node cannot acquire the positioning information of the first communication node, the target time-frequency resource block belongs to the first time-frequency resource pool.

7. A second communication node for wireless communications, comprising:
a second transmitter, to transmit first information and to transmit second information, the first information and the second information being used for determining a first time-frequency resource pool and a second time-frequency resource pool respectively; and a second receiver, to receive a first signal, the first signal occupying a target time-frequency resource block, the first signal is used for random access;
wherein the first time-frequency resource pool comprises a positive integer number of first-type time-frequency resource block(s), and the second time-frequency resource pool comprises a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block comprised in the first time-frequency resource pool, or the target time-frequency resource block is one second-type time-frequency resource block comprised in the second time-frequency resource pool; and positioning information of the first communication node is used for determining a time-frequency resource pool to which the target time-frequency resource block belongs between the first time-frequency resource pool and the second time-frequency resource pool; an absolute value of a time difference between a start time of transmitting the first signal and a reference time is equal to a first timing adjustment quantity, and a receive timing of the first communication node is used for determining the reference time; when the target time-frequency resource block belongs to the first time-frequency resource pool, the first timing adjustment quantity is greater than 0; and when the target time-frequency resource block belongs to the second time-frequency resource pool, the first timing adjustment quantity is equal to 0.

8. The second communication node according to claim 7, wherein the second receiver determines a target sequence; when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1.

9. The second communication node according to claim 8, wherein the second transmitter transmits third information; the third information is used for determining X candidate sequences, and X is a positive integer greater than 1; the target sequence is one of the X candidate sequences, and the transmitter of the first signal selects the target sequence among the X candidate sequences randomly.

10. The second communication node according to claim 7, wherein the second transmitter transmits a first signaling in a first time window; a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window out of the Y candidate time windows.

11. The second communication node according to claim 7, wherein the second receiver receives a second signal; the second signal carries fourth information, and the fourth information is used for indicating a positioning capability of a transmitter of the second signal.

12. The second communication node according to claim 7, when the transmitter of the first signal can acquire the positioning information of the transmitter of the first signal, the transmitter of the first signal determines by itself a time-frequency resource pool to which the target time-frequency resource block belongs between the first time-frequency resource pool and the second time-frequency resource pool; when the transmitter of the first signal cannot acquire the positioning information of the transmitter of the first signal, the target time-frequency resource block belongs to the first time-frequency resource pool.

13. A method in a first communication node for wireless communications, comprising:
receiving first information and receiving second information, the first information and the second information being used for determining a first time-frequency resource pool and a second time-frequency resource pool respectively; and
transmitting a first signal, the first signal occupying a target time-frequency resource block, the first signal is used for random access;
wherein the first time-frequency resource pool comprises a positive integer number of first-type time-frequency resource block(s), and the second time-frequency resource pool comprises a positive integer number of second-type time-frequency resource block(s); a number of resources occupied in time domain by any one first-type time-frequency resource block in the first time-frequency resource pool is not equal to a number of resources occupied in time domain by any one second-type time-frequency resource block in the second time-frequency resource pool; the target time-frequency resource block is one first-type time-frequency resource block comprised in the first time-frequency resource pool, or the target time-frequency resource block is one second-type time-frequency resource block comprised in the second time-frequency resource pool; and positioning information of the first communication node is used for determining a time-frequency resource pool to which the target time-frequency resource block belongs between the first time-frequency resource pool and the second time-frequency resource pool; an absolute value of a time difference between a start time of transmitting the first signal and a reference time is equal to a first timing adjustment quantity, and a receive timing of the first communication node is used for determining the reference time; when the target time-frequency resource block belongs to the first time-frequency resource pool, the first timing adjustment quantity is greater than 0;
and when the target time-frequency resource block belongs to the second time-frequency resource pool, the first timing adjustment quantity is equal to 0.

14. The method in the first communication node according to claim 13, comprising:
receiving third information; and
determining a target sequence;
when the target time-frequency resource block belongs to the first time-frequency resource pool, the target sequence is repeated W1 time(s) to generate the first signal; when the target time-frequency resource block belongs to the second time-frequency resource pool, the target sequence is repeated W2 time(s) to generate the first signal; W1 is a positive integer, and W2 is a positive integer not equal to W1; the third information is used for determining X candidate sequences, and X is a positive integer greater than 1; the target sequence is one of the X candidate sequences, and the first communication node selects the target sequence among the X candidate sequences randomly.

15. The method in the first communication node according to claim 13, comprising:
receiving a first signaling in a first time window;
wherein a position of the target time-frequency resource block in time-frequency domain is used for determining a first signature ID, and the first signaling carries the first signature ID; the first time window is one of Y candidate time windows, Y is a positive integer greater than 1, and any two of the Y candidate time windows are orthogonal; and a time-frequency resource pool to which the target time-frequency resource block belongs is used for determining the first time window from the Y candidate time windows.

16. The method in the first communication node according to claim 13, comprising:
transmitting a second signal;
wherein the second signal carries fourth information, and the fourth information is used for indicating a positioning capability of the first communication node.

17. The method in the first communication node according to claim 13, when the first communication node can acquire the positioning information of the first communication node, the first communication node determines by itself a time-frequency resource pool to which the target time-frequency resource block belongs between the first time-frequency resource pool and the second time-frequency resource pool; when the first communication node cannot acquire the positioning information of the first communication node, the target time-frequency resource block belongs to the first time-frequency resource pool.

* * * * *